Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 1
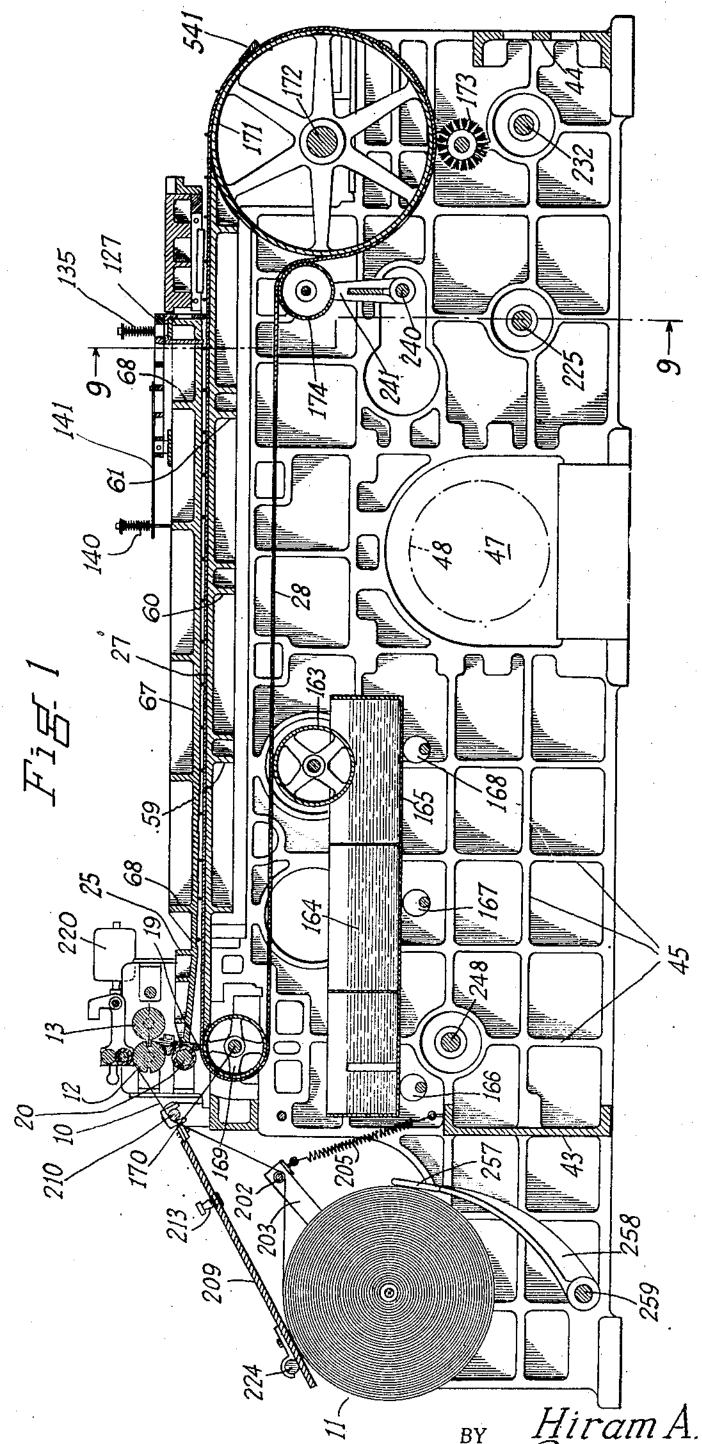
INVENTOR.
BY Hiram A. Perkins
R. H. Holbrook ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 2
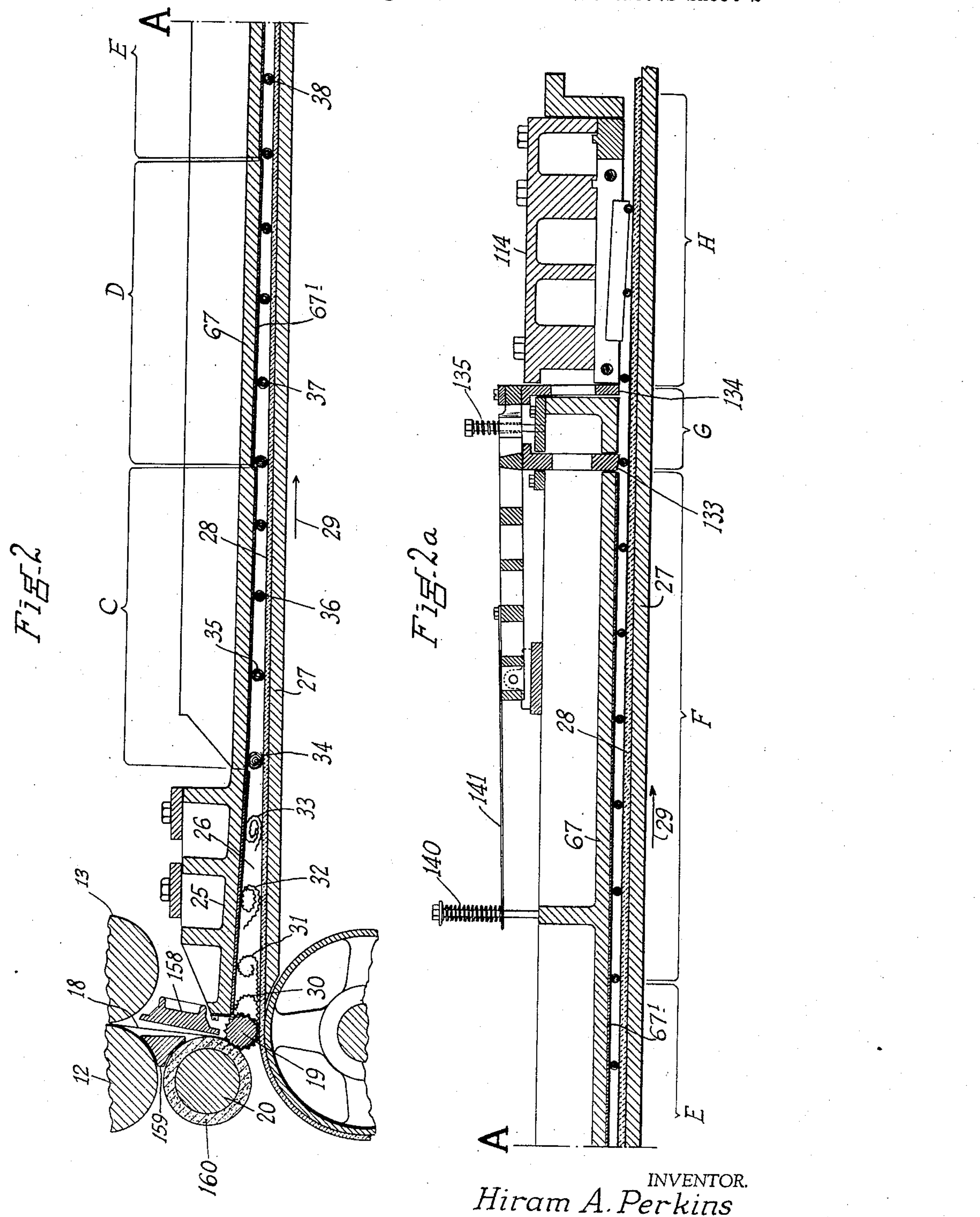
INVENTOR.
Hiram A. Perkins
BY
W. H. Holbrook
ATTORNEY.

METHOD OF AND APPARATUS FOR THE MANUFACTURE OF ROD-LIKE ARTICLES
Filed Aug. 31, 1940 16 Sheets-Sheet 3
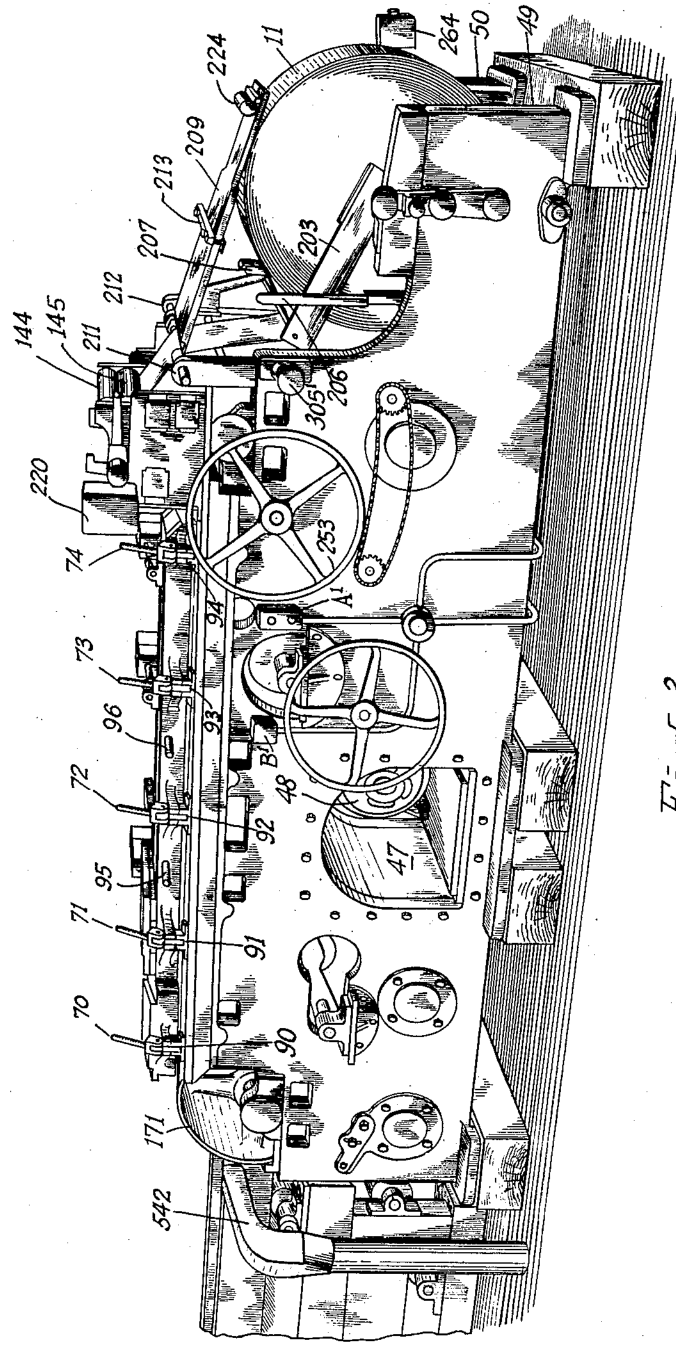
INVENTOR.
Hiram A. Perkins
BY
R.W. Holbrook
ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 4
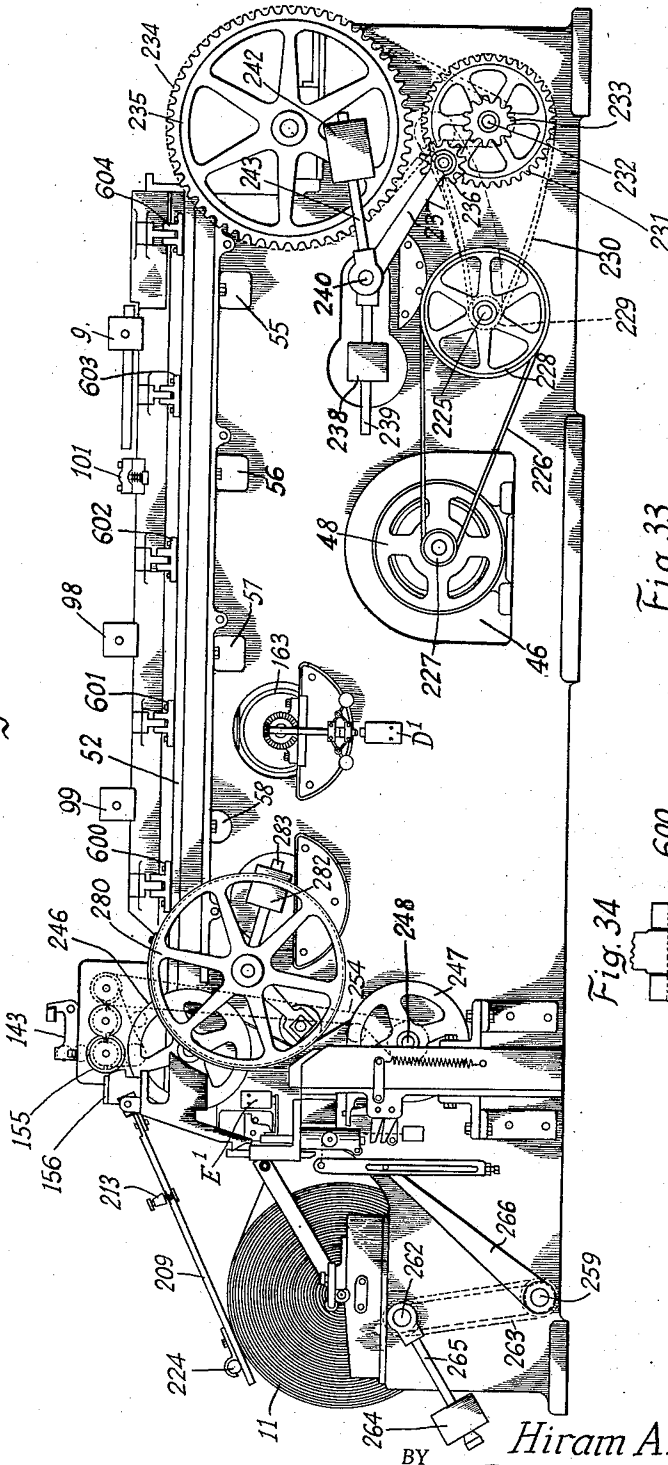
INVENTOR.
Hiram A. Perkins
BY
W. Holbrook
ATTORNEY.

METHOD OF AND APPARATUS FOR THE MANUFACTURE OF ROD-LIKE ARTICLES
Filed Aug. 31, 1940 16 Sheets-Sheet 5
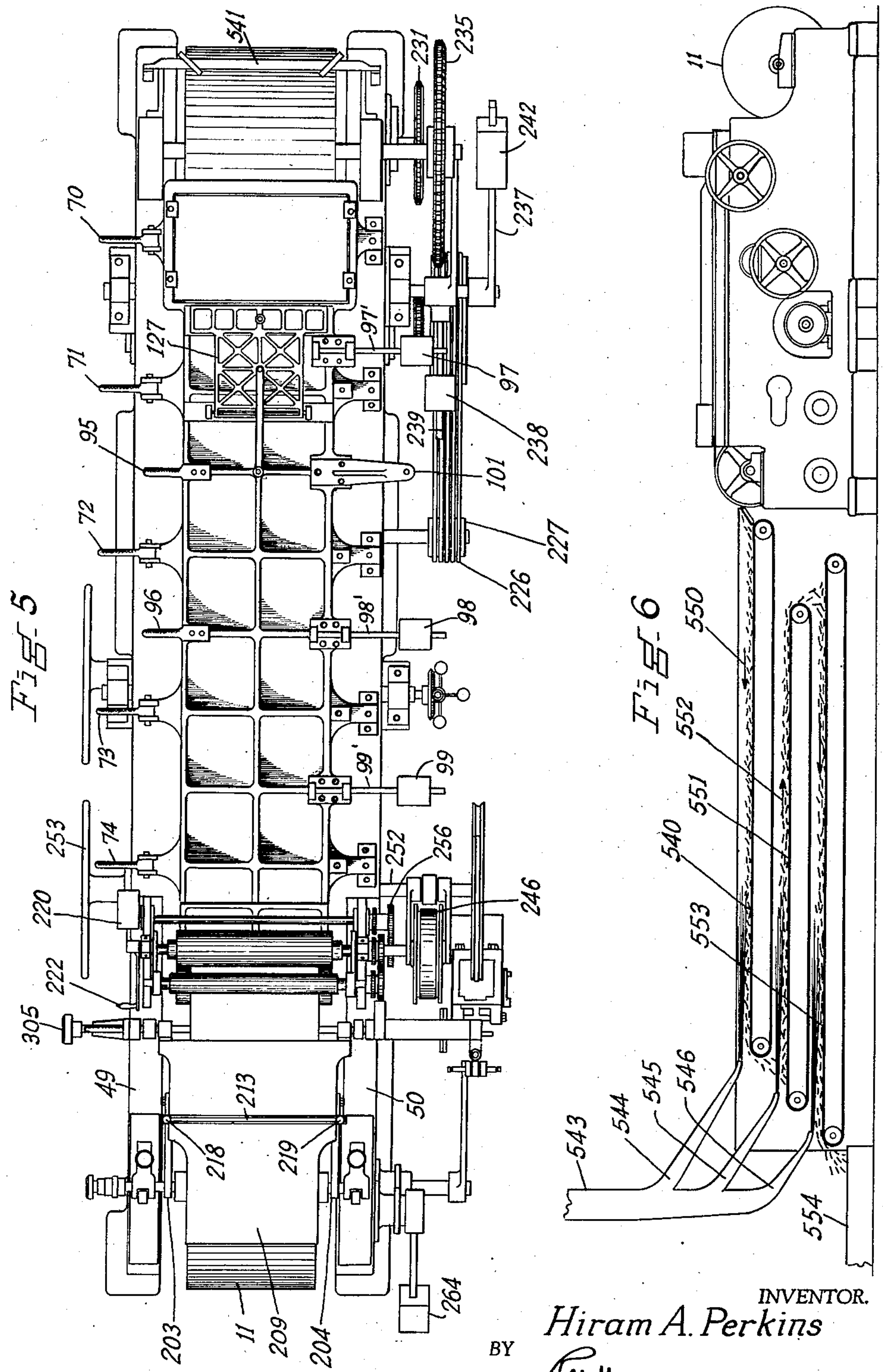
INVENTOR.
*Hiram A. Perkins*
BY [signature]
ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 6
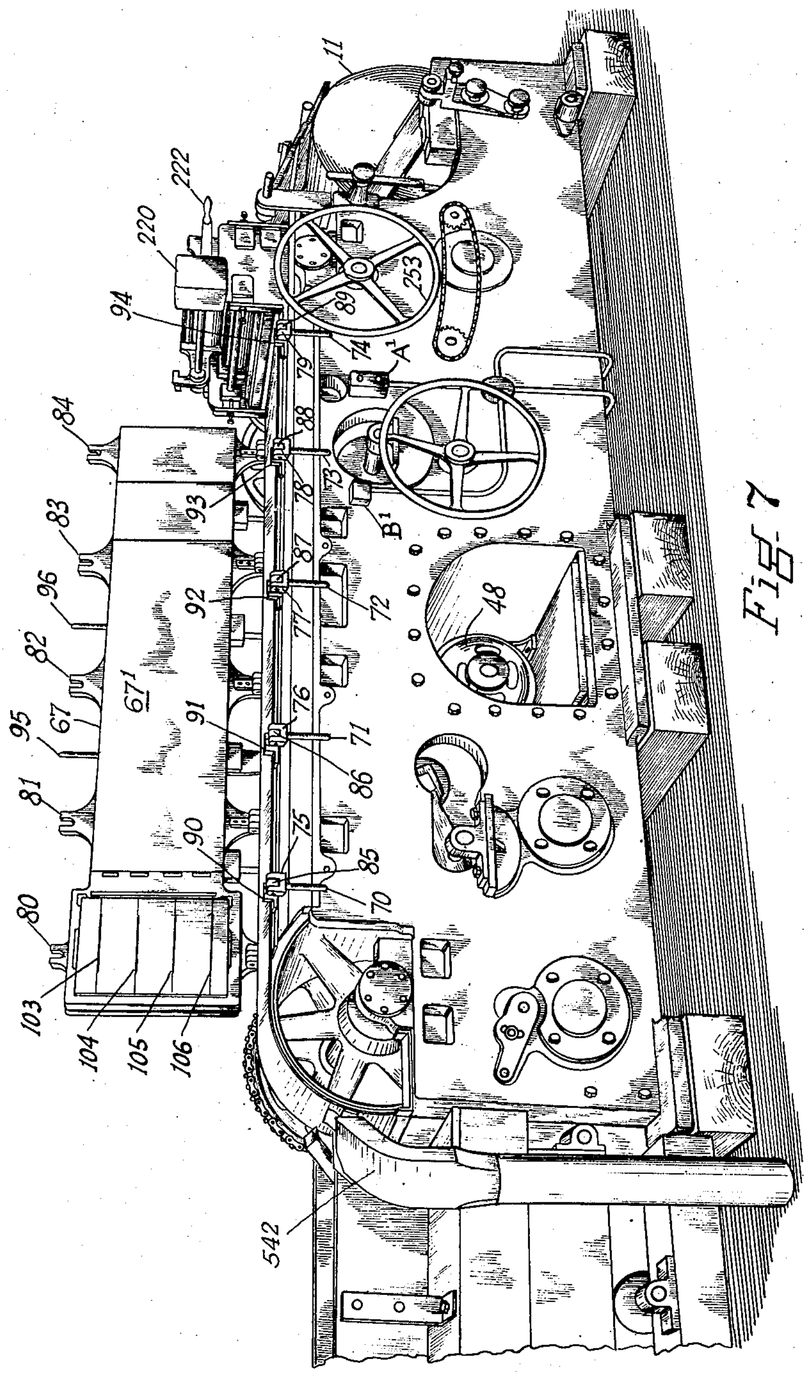
INVENTOR.
Hiram A. Perkins
BY [signature] ATTORNEY.

METHOD OF AND APPARATUS FOR THE MANUFACTURE OF ROD-LIKE ARTICLES
Filed Aug. 31, 1940 16 Sheets-Sheet 7
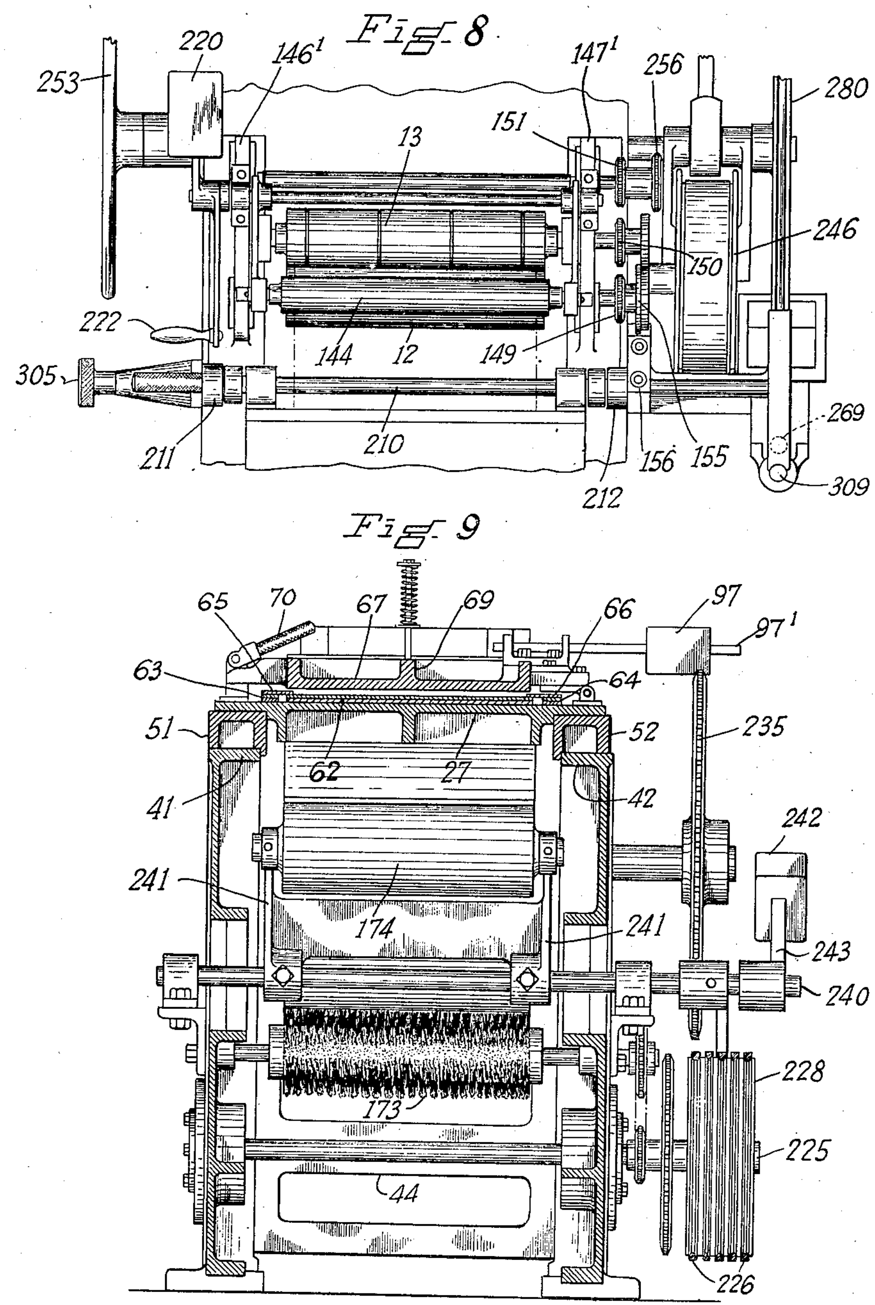
INVENTOR.
Hiram A. Perkins
BY
[signature]
ATTORNEY.

Sept. 12, 1944. H. A. PERKINS 2,357,846

METHOD OF AND APPARATUS FOR THE MANUFACTURE OF ROD-LIKE ARTICLES

Filed Aug. 31, 1940 16 Sheets-Sheet 8

INVENTOR.
Hiram A. Perkins

BY [signature]
ATTORNEY.

METHOD OF AND APPARATUS FOR THE MANUFACTURE OF ROD-LIKE ARTICLES

Filed Aug. 31, 1940 16 Sheets-Sheet 9

INVENTOR.
Hiram A. Perkins
BY
[signature]
ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 10
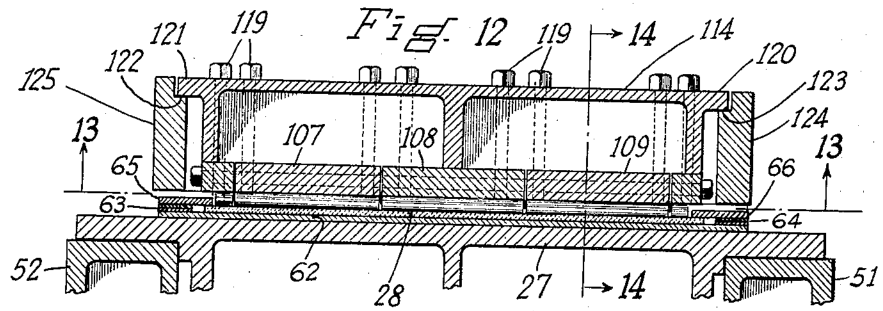
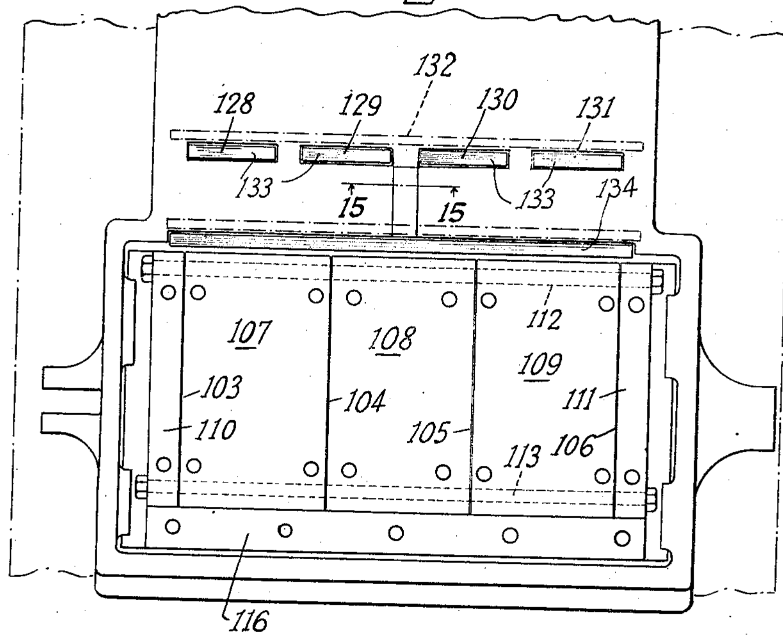
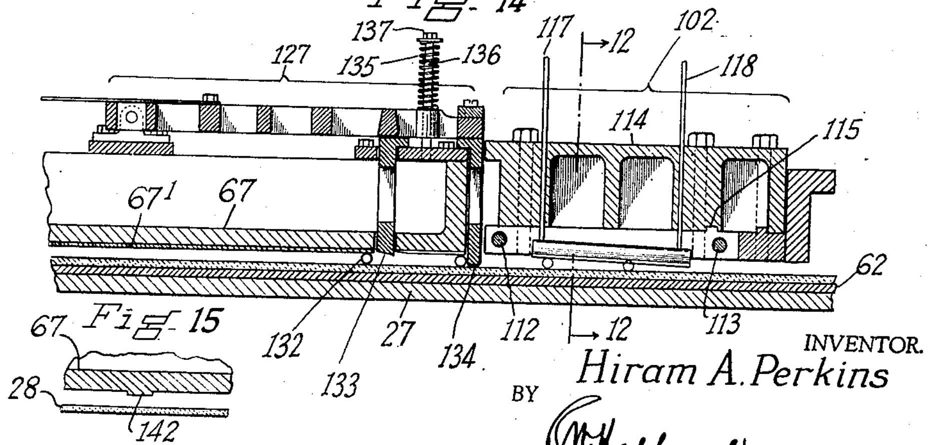
INVENTOR.
Hiram A. Perkins
BY
[signature]
ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 11
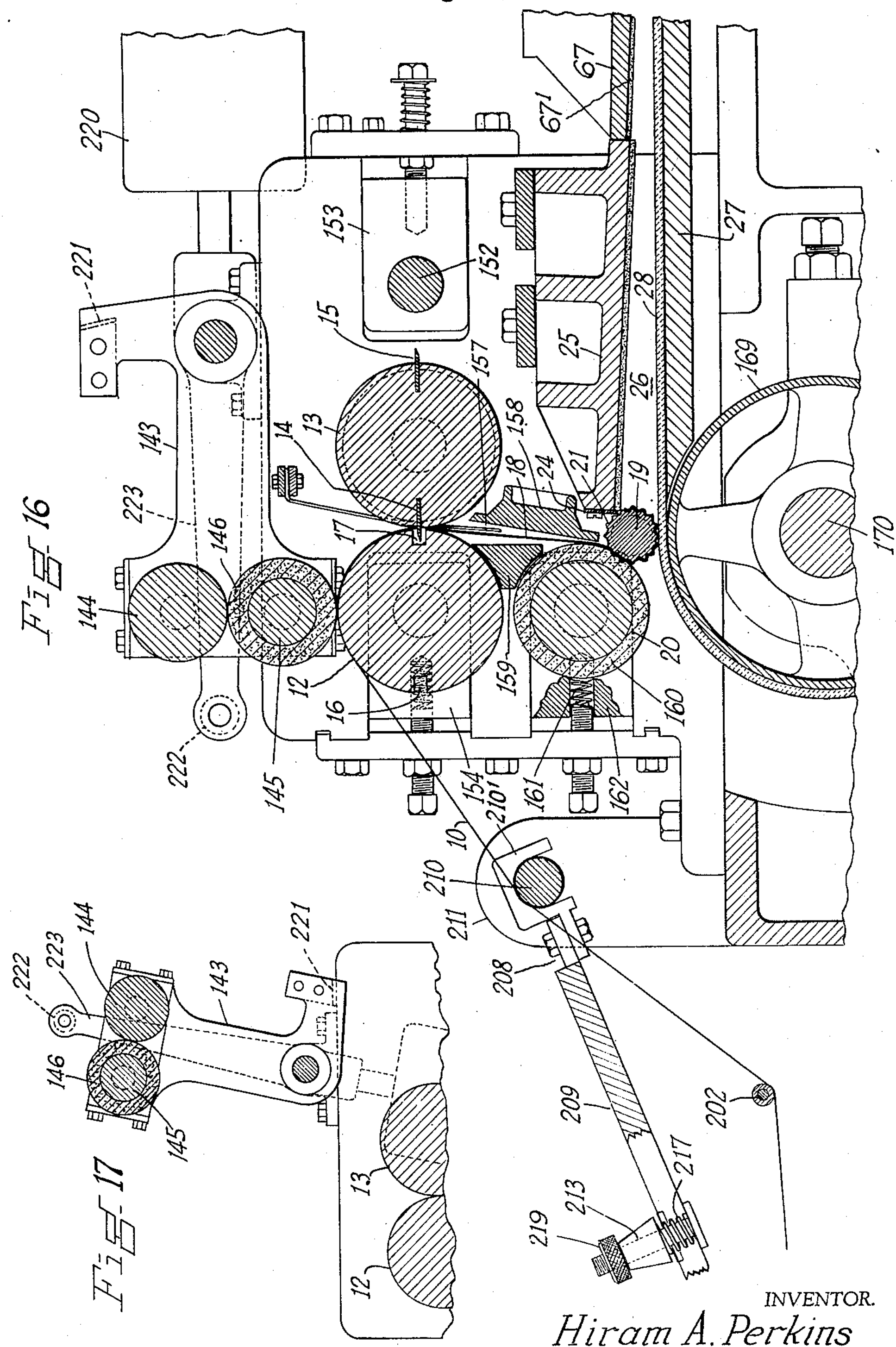
INVENTOR.
Hiram A. Perkins
BY
ATTORNEY.

Sept. 12, 1944. H. A. PERKINS 2,357,846
METHOD OF AND APPARATUS FOR THE MANUFACTURE OF ROD-LIKE ARTICLES
Filed Aug. 31, 1940 16 Sheets-Sheet 12
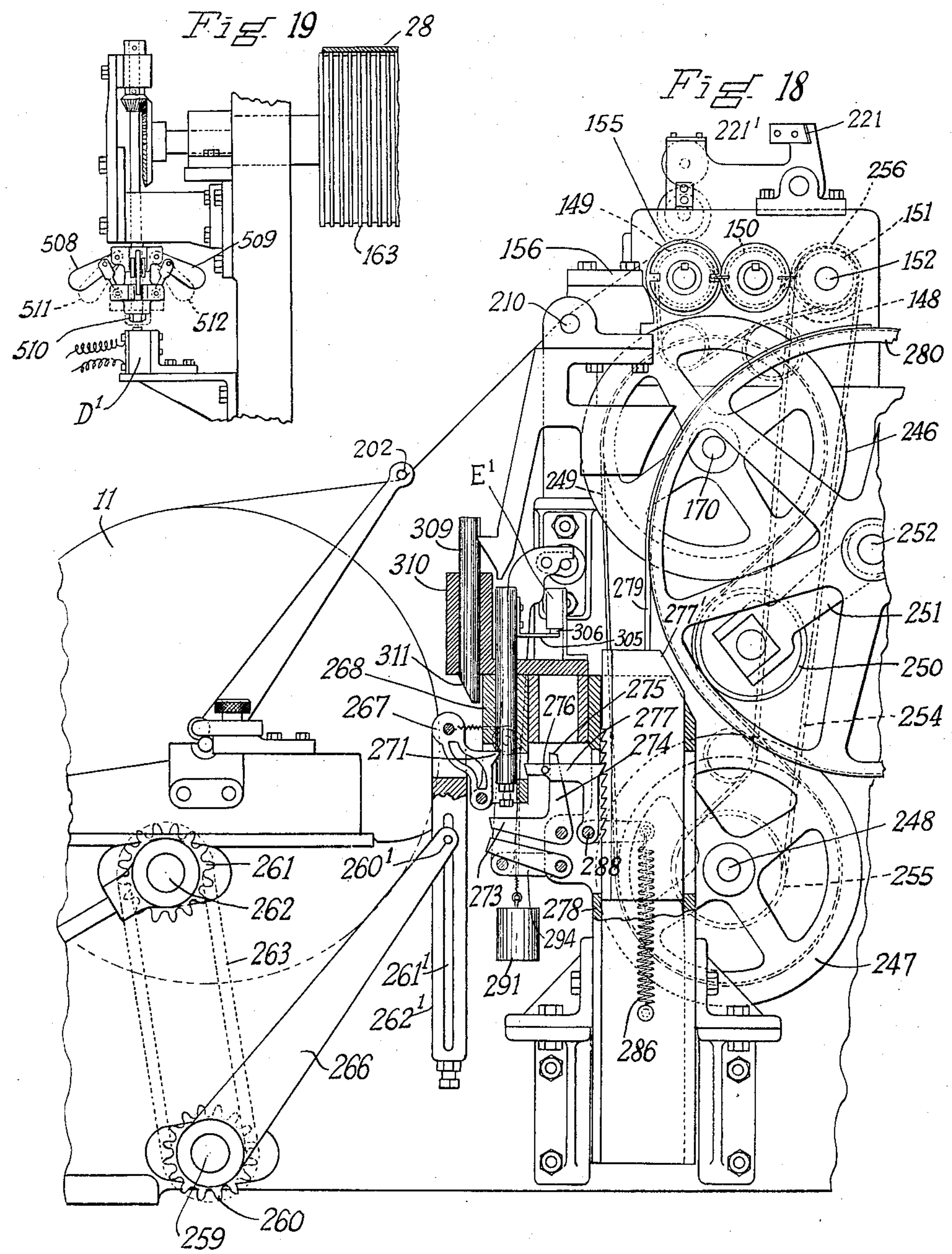
INVENTOR.
Hiram A. Perkins
BY
W. H. Holbrook
ATTORNEY.

Sept. 12, 1944.  H. A. PERKINS  2,357,846
METHOD OF AND APPARATUS FOR THE MANUFACTURE OF ROD-LIKE ARTICLES
Filed Aug. 31, 1940  16 Sheets-Sheet 13
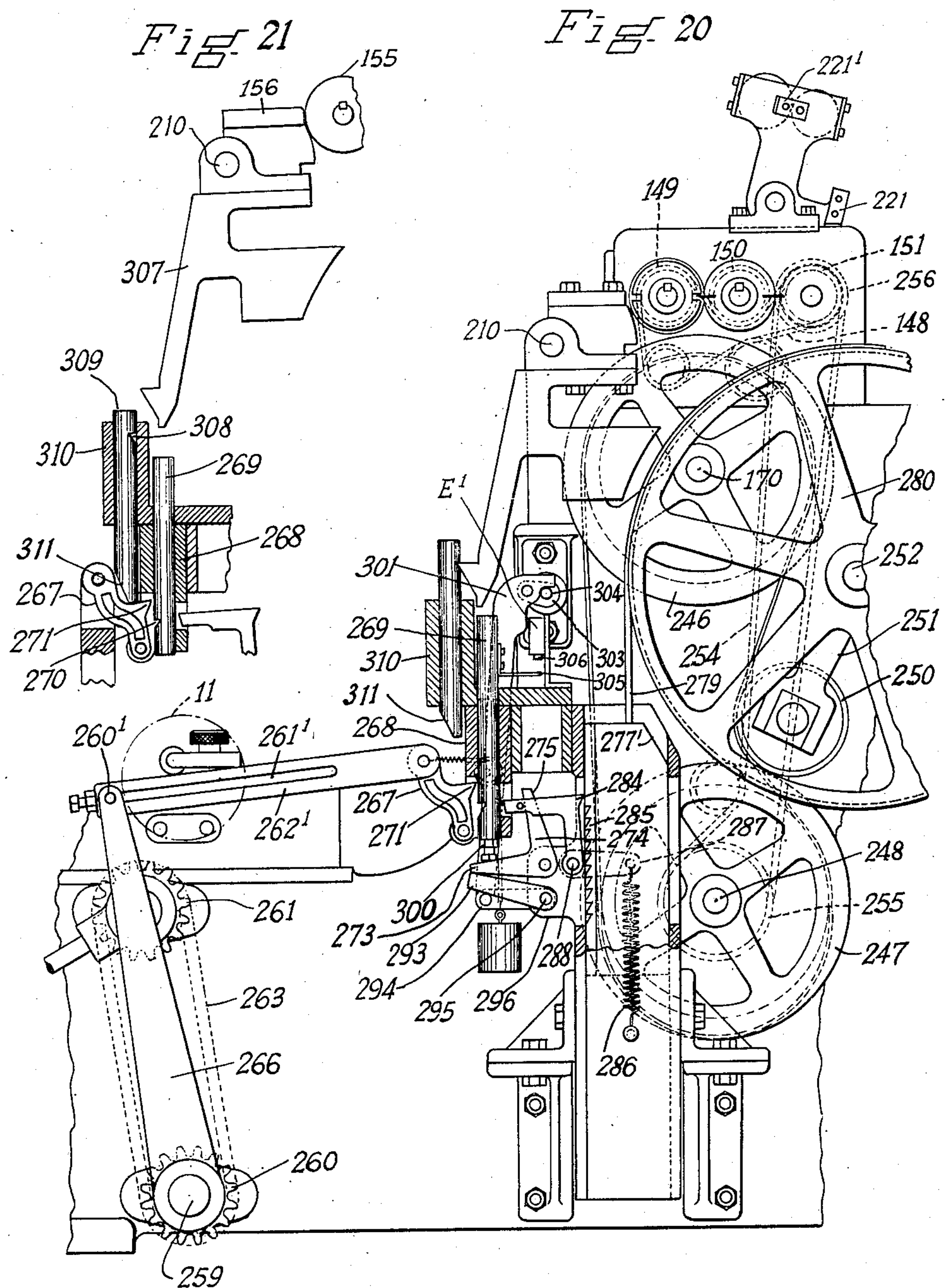
INVENTOR.
Hiram A. Perkins
BY
[signature]
ATTORNEY.

METHOD OF AND APPARATUS FOR THE MANUFACTURE OF ROD-LIKE ARTICLES
Filed Aug. 31, 1940 16 Sheets-Sheet 14
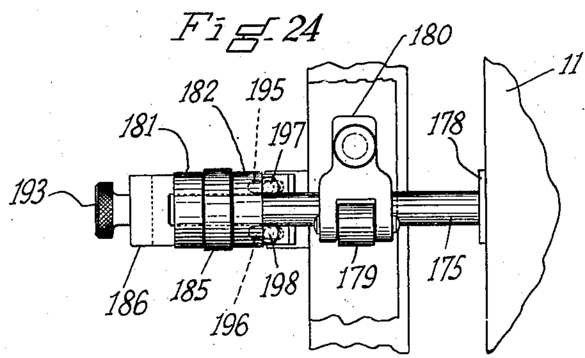
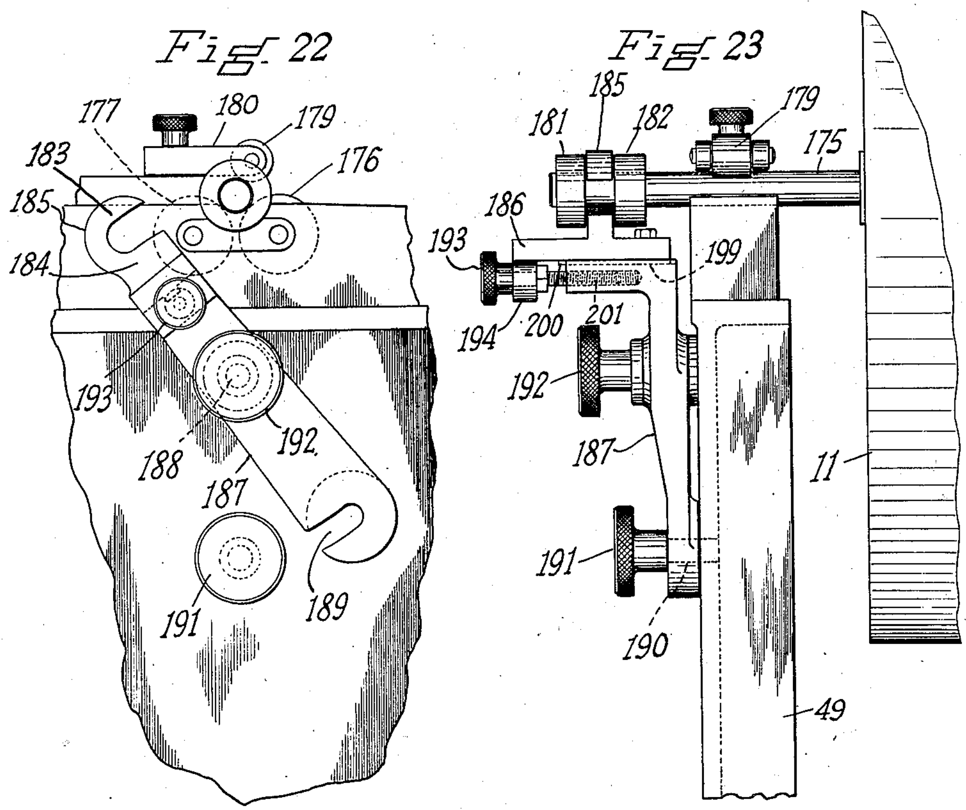
INVENTOR.
Hiram A. Perkins
BY
[signature]
ATTORNEY.

METHOD OF AND APPARATUS FOR THE MANUFACTURE OF ROD-LIKE ARTICLES
Filed Aug. 31, 1940 16 Sheets-Sheet 15
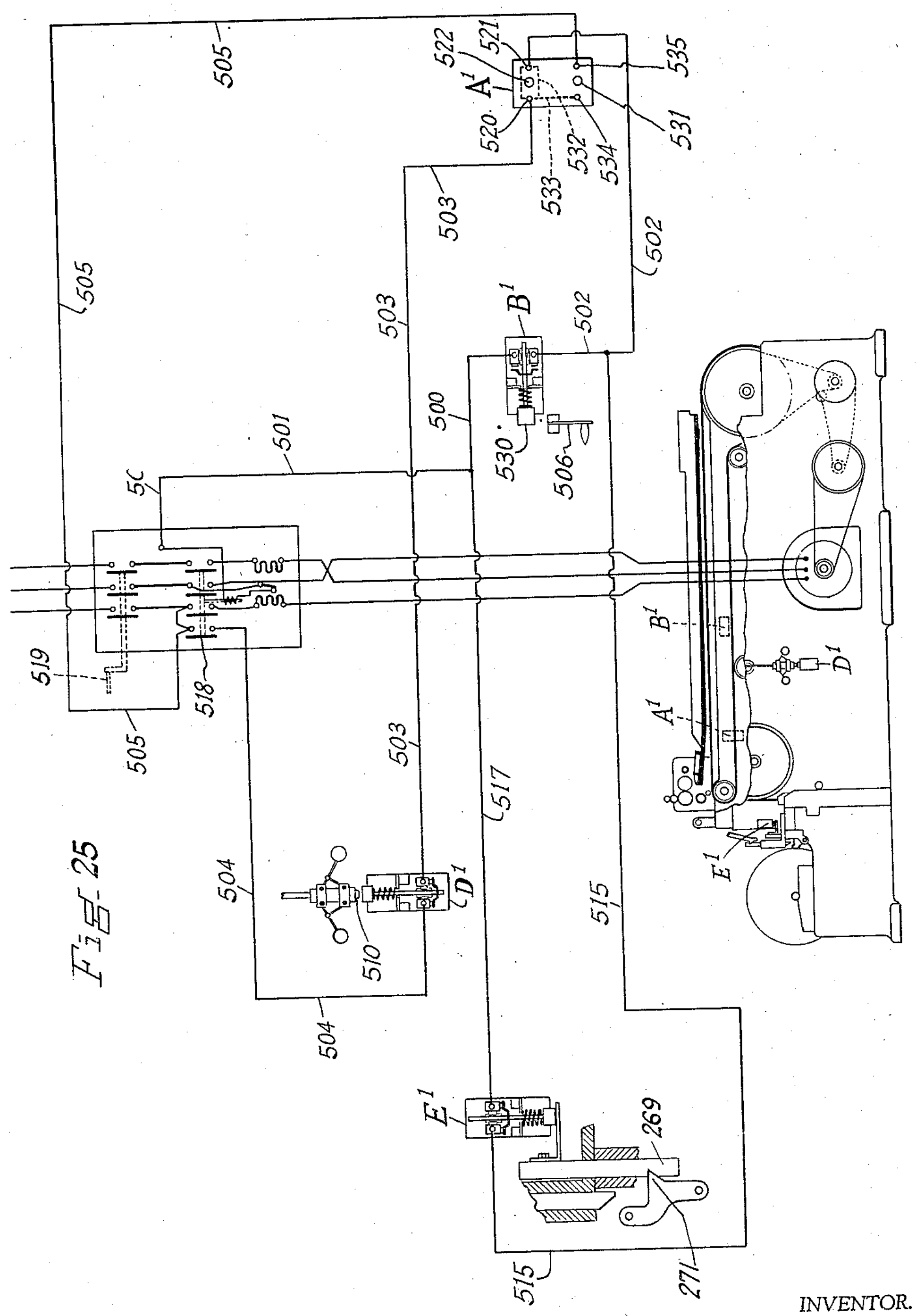
INVENTOR.
Hiram A. Perkins
BY
R. H. Holbrook
ATTORNEY.

METHOD OF AND APPARATUS FOR THE MANUFACTURE OF ROD-LIKE ARTICLES
Fig. 26
Fig. 28
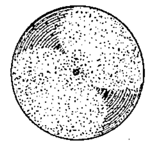
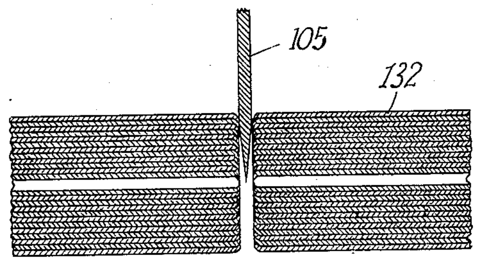
Fig. 27
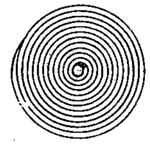
Fig. 29
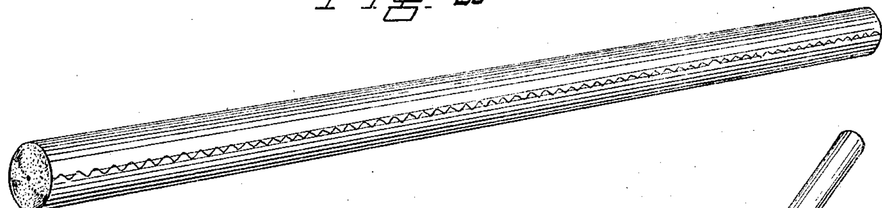
Fig. 30
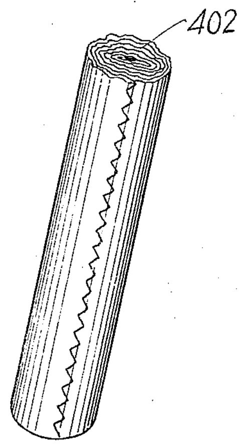
Fig. 31
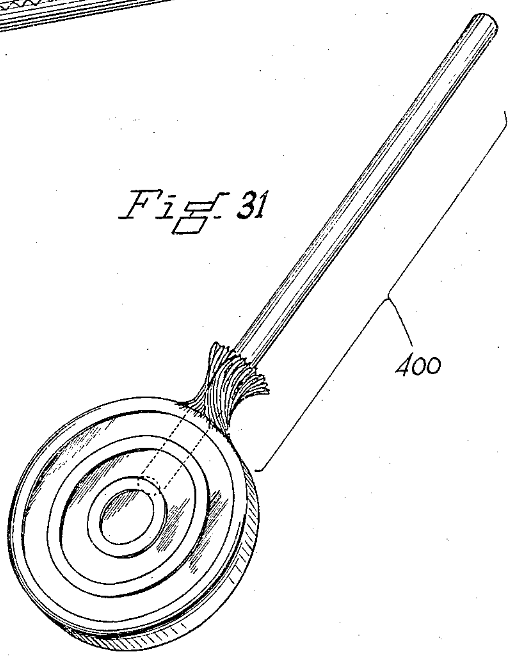
INVENTOR.
Hiram A. Perkins
BY
R. M. Holbrook
ATTORNEY.

Patented Sept. 12, 1944 2,357,846

UNITED STATES PATENT OFFICE 2,357,846

METHOD OF AND APPARATUS FOR THE MANUFACTURE OF RODLIKE ARTICLES

Hiram A. Perkins, Rochester, N. Y., assignor to Setter Bros. Inc., Cattaraugus, N. Y., a corporation of New York Application August 31, 1940, Serial No. 354,945

8 Claims. (Cl. 93—1)

This invention relates to the manufacture of candy sticks. It also involves the use of sheet material strips which are convoluted and bonded into compact rolls forming rigid rod-like members of small diameter.

The invention further includes within its purview improvements in confections of the stick supported type, and improvements in dowel-like members particularly adapted for such confections.

The invention is also related to the invention of my co-pending application Serial No. 297,684 filed on October 3, 1939, (now, Patent 2,308,537, 1-19-43 and Reissue Patent 22,478, 5-10-44) and involves such improvements over the apparatus shown in the co-pending application that the illustrative candy sticks can be effectively produced in much greater quantity per unit of time, thus correspondingly lowering the cost of production.

Other improvements of the present invention materially reduce the time required to place a new supply roll in operative position on the machine and to start the machine with the sheet material of a new roll.

A still further improvement over the apparatus disclosed in my prior co-pending application involves high speed operation in combination with the straightening of the master sticks and squaring them up to the stick cutter at an exact angle of 90 degrees to the direction of travel of the compacting belt, or carrier.

In compliance with the Federal patent statutes and particularly sec. 4888 R. S., the invention will now be described with reference to certain specific embodiments, other objects and characteristics of the invention appearing from that description.

The description of the invention has reference to the accompanying drawings in which the reference characters indicate parts which are similarly referred to in the description.

In the drawings:

Fig. 1 is a longitudinal vertical section through a machine for manufacturing the illustrative candy sticks, the machine producing sticks of less than ¼ in. diameter at a rate at least as great as 900 sticks per minute.

Figs. 2 and 2*a* are partial longitudinal vertical sections indicating the different actions which take place upon the paper or other sheet material as it proceeds through the successive operative zones.

Fig. 3 is a perspective view of the machine.

Fig. 4 is a side elevation of the illustrative machine.

Fig. 5 is a plan.

Fig. 6 is a view showing the machine in combination with a dryer to which the sticks are delivered by the machine.

Fig. 7 is a perspective view showing the presser plate structure disposed in its inoperative position so as to provide for inspection of the machine and cleaning of the presser plate or its associated components.

Fig. 8 is an enlarged plan of the roll stand.

Fig. 9 is a vertical transverse section on the line 9—9 of Fig. 1.

Fig. 12 is a vertical transverse section of the machine through the stick cutter, taken on the section line 12—12 of Fig. 14.

Fig. 13 is a bottom plan of the stick cutter taken at the level of the line 13—13 of Fig. 12, and looking in the direction of the arrows.

Fig. 14 is a partial longitudinal vertical section on the line 14—14 of Fig. 12.

Fig. 15 is a detail view in the nature of a vertical section taken transversely of the machine and on a section line 15—15 of Fig. 13. This view shows the specific presser plate structure adjacent the stick cutter.

Fig. 16 is a vertical section through the roll stand, showing on an enlarged scale the arrangement of the elements which act upon the paper or other sheet material as it enters the machine.

Fig. 17 is a detail view illustrating the manner in which the weighting rollers of the roll stand may be quickly moved to their inoperative position to facilitate the placement of a new supply roll.

Fig. 18 is a view showing parts of the operating mechanism and control mechanism.

Fig. 19 is a detail view in the nature of an elevation showing the arrangement of a limit switch operated by a centrifugal governor which stops the operation of the machine in the event that the speed of the main belt is undesirably decreased.

Fig. 20 is a view similar to Fig. 18, but illustrating the automatic movement of some of the control parts as a result of a predetermined reduction in the diameter of the paper supply roll.

Fig. 21 is a detail view of a portion of the control mechanism shown in Figs. 16 and 18, this view indicating the action of the control parts which stop the operation of the main belt (or carrier) and the roll stand whenever the paper starts to wind up on one of the rolls of the strip cutter, or whenever these rolls encounter an obstruction.

Fig. 22 is a side elevation illustrating the mechanism by which paper from the supply rolls may be precisely and correctly aligned with the roll stand mechanism, the convoluter, and the compacter.

Fig. 23 is an elevation of the mechanism shown in Fig. 22, Fig. 23 being taken from the front end of the machine and showing a part of the paper supply roll.

Fig. 24 is a partial plan showing the arrangement of the parts of the mechanism illustrated in Figs. 22 and 23.

Fig. 25 is a diagrammatic view showing a layout of the electrical switches and other component parts of the control mechanism and schematically illustrating their association with the operating parts of the machine.

Fig. 26 is a vertical section illustrating the action and the effect of the stick cutter knives in severing the master stick.

Fig. 27 is a vertical cross section illustrating the structure of the end of the master stick before it is acted upon by the knives of the strip cutter.

Fig. 28 is an end elevation of one of the illustrative candy sticks after it has been severed by the stick cutter from the master stick, this view illustrating the cementing, molding, or homogenizing effect of the stick cutting operation.

Fig. 29 is a perspective view showing one of the illustrative candy sticks on a large scale.

Fig. 30 shows the manner in which the illustrative sticks break upon being subjected to such a sudden endwise impact as would be involved in the falling of a child with the illustrative stick supported confection in its mouth.

Fig. 31 is a perspective view of the illustrative confection, including the stick of this investion.

Figures 33 and 34 are detail views indicating the shim adjustment arrangement whereby the presser plate may be adjusted to manufacture convoluted rolls of different diameters.

GENERAL DESCRIPTION OF THE ACTION OF THE MACHINE

Figure 10:
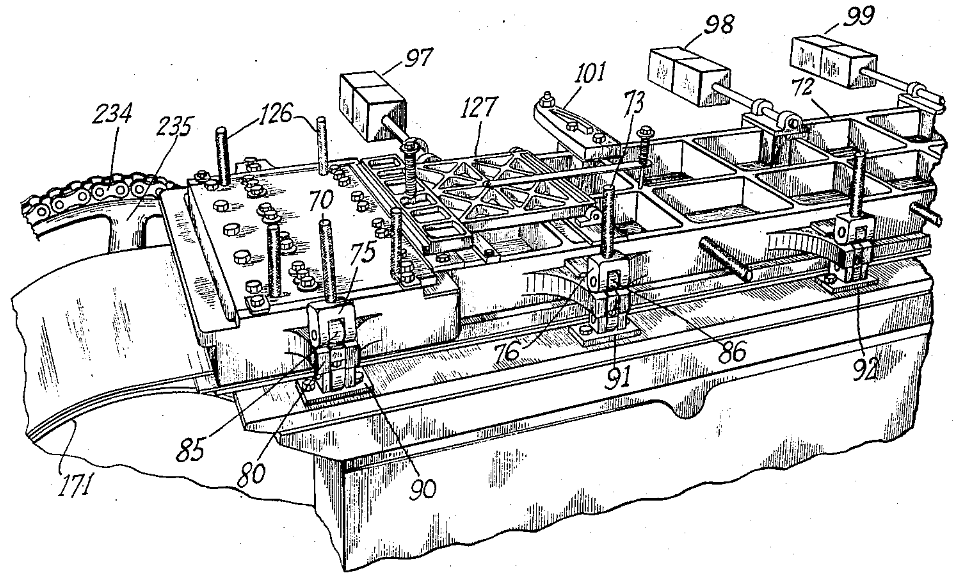
Fig. 10 is a partial perspective view showing in more detail the structure of the presser plate structure, the master stick cutter, and the means for straightening and aligning the master sticks.
Figure 32:
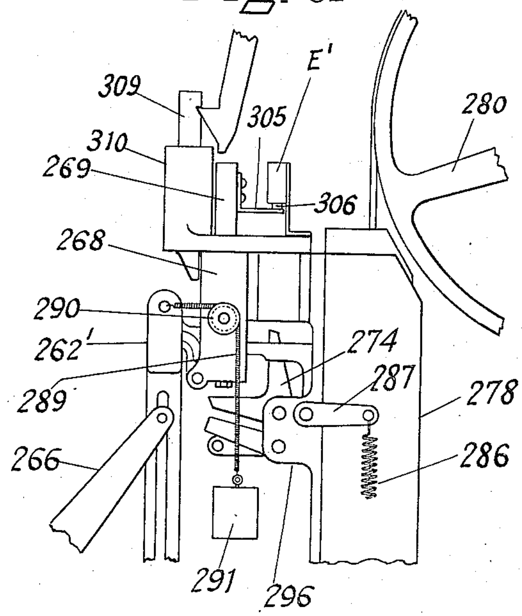
Fig. 32 is a detail view of a part of the control mechanism.
Figure 11:
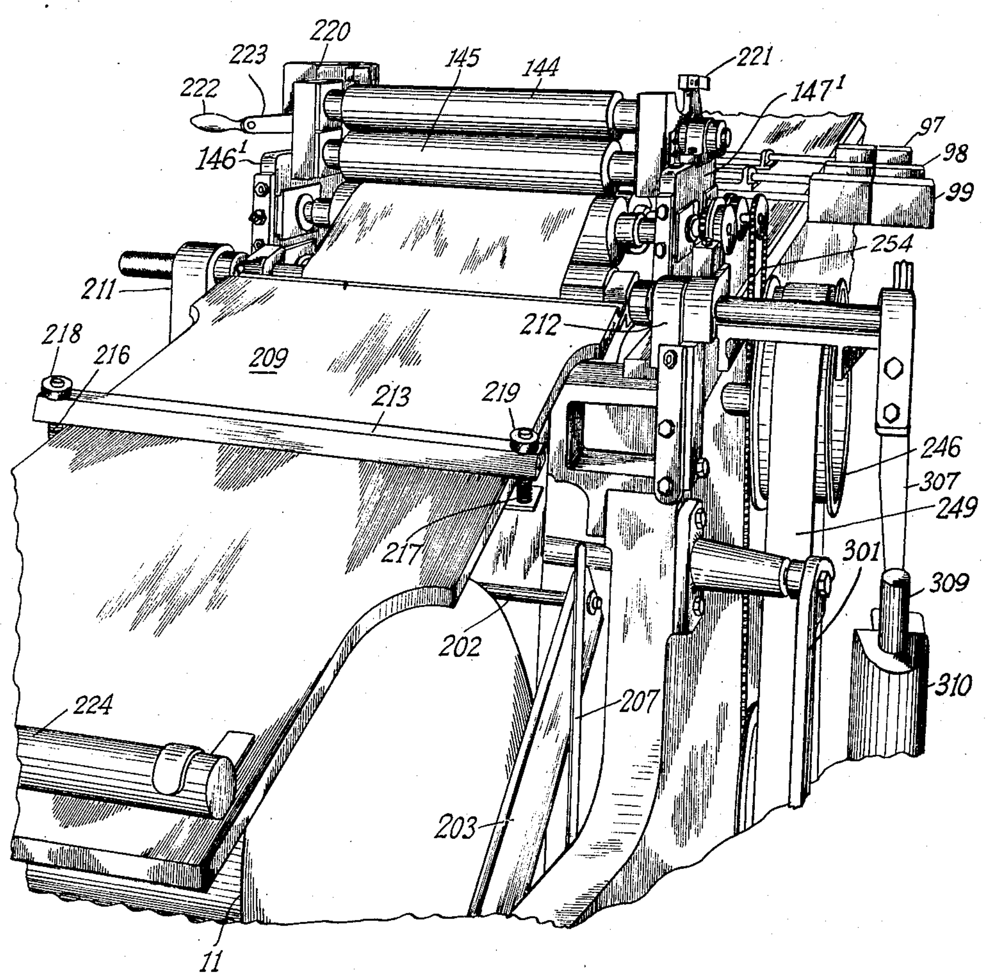
Fig. 11 is a perspective view taken from the infeed end of the machine and showing the relationship of the supply roll, roll stand elements, the supply roll brake, and the means which facilitate the proper starting of the machine after the installation of a new supply roll.

In the operation of the illustrative machine supply rolls of a sized paper are employed. The paper is preferably white and its properties are such that it facilitates the bonding of the sticks at a rapid rate of production and promotes the manufacture of a superior product.

Also, when the sizing of the paper involves a high percentage of starch or some similar material the effect of the pressure and pressure-developed heat, in the operation of the machine, serves to have an "ironing" effect upon the sizing of the paper so as to not only give the illustrative stick a smooth and glossy appearance but also to enhance the stiffness or rigidity to the stick.

A third advantage flowing from the use of such sized paper resides in the frangible characteristics of the illustrative stick and the manner in which it breaks when subjected to an accidental endwise impact during normal consumption of the confection product of which it is a part. Any such sudden impact of this character results in a substantially complete stick fracture with the fractured parts having soft ends.

During the operation of the machine paper or other sheet material 10 (Fig. 1) is continuously unwound from a supply roll 11 and pulled into the machine by the action of the strip cutter rolls 12 and 13, and their associated rolls. The strip cutter roll 13 is provided at diametrically opposed positions on its periphery with projecting knives 14 and 15 or saw teeth which cooperate with recesses 16 and 17 in the roller 12 to sever the paper into strips (see Fig. 16).

Each severed strip 18 passes downwardly from the strip cutter and is guided into contact with a fluted crimper roll 19 and a rubber covered roll 20 with which the crimper roll may be said to be inter-geared. The rubber covered roll 20 is preferably positively driven, and its intergearing with the crimper roll results from such a relative positioning of the crimper roll 19 and the rubber covered roll 20 that the teeth 21 of the former depress the rubber covering of the roll 20 during the operation of the machine.

Each paper strip 18 descending from the cutter roll is thus gripped between the crimper roll and the rubber covered roll and is crimped or creased by the sharp edges or flutes of the crimper roll as the strip advances.

The crimper roll 19 is also provided along its length with a plurality of circumferential grooves, the base of each of which is lower than the grooves of the flutes of the crimper roll. These grooves receive the lower ends of correspondingly shaped teeth of a stripper plate 24 rigidly secured to a heavy convoluter plate 25 which determines the upper surface of a tapered passage in which the crimped strips are initially convoluted.

The lower surface of the convoluting passageway 26, particularly indicated in the upper part of Fig. 2 of the drawings, is determined by a fixed bedplate structure 27 over which is trained a main belt or carrier 28, normally moving in the direction of the arrows 29 of Fig. 2.

As the leading edge of a paper strip 18 proceeds around the crimper roll 19 it comes in contact with the teeth of the stripper plate which act to separate it from the crimper roll. This action continues until the stripped part of the sheet material forms a loop 30 projecting sufficiently away from the crimper roller to come into contact with the continuously moving carrier 28. Thereupon the remaining part of the crimped strip is separated from the crimper roller at an advanced position and the separated loop is then so increased in length and so moved away from the crimper roller that the conjoint effect of the crimping of the strip and the movement of the belt causes the strip to begin to convolute as indicated at 31 in Fig. 2.

As the crimped and convoluted strip is moved along by the carrier the number of its convolutions increases, and the overall transverse dimension of the loosely convoluted roll decreases as indicated at 32–38 inc. (Fig. 2). The effect of this action, in combination with the taper of the convoluting passageway is such that the loosely convoluted roll assumes somewhat of an ovate shape as at 33. This is undesirable in the present product, and, the operation of the illustrative apparatus would be much less efficient, possibly to the extent of being economically inoperative if such action were allowed to continue. The effect of such action is counteracted at the end of the convoluting passageway 26 by providing a first compacting zone C in which the stick passageway is such that it permits the loosely convoluted rolls to change their ovate shape and assume a more nearly round contour immediately after they reach the exit of the convoluting passage, and as indicated by a comparison of stages 33 and 34.

The compacting passage 40 in the zone C is preferably tapered downwardly from its entrance at stage 34 so as to speed up the further convoluting and compacting of the loosely wound rolls. This speed-up however again causes the compacted rolls to assume an ovate shape as they reach the end of the zone C and, consequently, there is provided a second compacting zone D at the entry of which the compacted rolls are permitted to change from the ovate shape to a more nearly round shape. Otherwise the second compacting zone is similar to the first compacting zone but it has such characteristics that the convoluted sticks are decreased in their outside diameter as compared to the sticks discharging from the first compacting zone.

A third compacting zone E bears the same relationship to the preceding compacting zone D as the latter does to the compacting zone C and beyond the zone E the compacted sticks pass through a longer zone F. In the latter the compacted sticks are subjected to pressure and a convoluting effect for such an increased length of time that the sticks become permanently set. Also, this action takes place simultaneously with a bonding action which will receive subsequent reference.

Beyond the zone F the sticks pass through a zone G in which they are straightened and squared up with their longitudinal axes at substantially 90 degrees to the direction of travel of the main belt. This positioning of the sticks facilitates clean and sharp severing of the master sticks into candy sticks of the desired length in the stick cutting zone H, and promotes the advantageous finishing or burnishing of the ends of the severed sticks.

THE STRUCTURE

*The frame*

The frame of the machine for carrying out the illustrative manufacture consists of two heavy side castings 41 and 42 rigidly joined by a plurality of transverse members such as those indicated at 43 and 44, in Figs. 1 and 9 of the drawings. These figures also illustrate the manner in which the side frame members are provided with a ribbed construction 45 so as to afford adequate strength without excessive weight.

On account of the high speed of operation of the machine necessary to effect such a high rate of production that the cost of manufacturing may be advantageously low it is essential that there be no appreciable vibration in the frame components. Furthermore on account of the high pressures exerted upon the compacting rolls as they pass through the machine the frame must be of considerable strength. A third reason for a strong and rigid frame is that the surfaces which determine the ultimate contour or shape of the product must be held accurately within close limits. To accomplish the desired high rate of production there are first formed long master sticks which are subsequently severed into candy sticks of the desired length, and to maintain a uniform diameter of such master sticks throughout their long lengths there are rigid bedplate constructions and presser plate constructions of high resistance to bending stresses between the side frames. The illustrative frame supports such structures and holds them continuously fixed in their desired relationships.

The side frame members are formed with motor openings 46 and 47 and are provided with projections 49 and 50 at the infeed end of the machine so as to facilitate the removal of exhausted paper supply rolls and the installing of new rolls in a minimum period of time.

Supported on top of the side members 41 and 42 of the main frame is the bedplate construction over which the main belt slides, and inasmuch as the bedplate determines the lower surface of the compacting and setting passageway the bedplate must be permanently and accurately set so as to give the correct vertical dimensions of the passageway within very close tolerances.

When the machine is set up side rails 51 and 52 are disposed along the top of each side member of the frame and below the bedplate. These rails may be held in the rigid assembly with the bedplate and side frame members by cap screws or other fastening devices which are secured rigidly to the frame. Openings 55—58, Figs. 1 and 7 in the side frame members permit such attachment of the side rails and bedplate to the frame. This construction facilitates the removal of the bedplate when the main belt is replaced. The side rails may be loosened and then turned so as to permit transverse supports to be inserted below the bedplate.

*The bedplate construction*

The particular structure of the bedplate 27 is shown in Figs. 1 and 9 of the drawings. It preferably consists of a casting including downwardly extending ribs such as those shown at 59, 60 and 61 which act as heat dissipating means as well as re-enforcing means.

Inasmuch as the main belt or carrier passes over and slides over the bedplate it is desirable that the friction be reduced, and for this purpose the top of the bedplate construction should be smooth. It may have a single superposed plate 62 (see Figs. 9, 12 and 14). The latter is preferably secured along its edges to the bedplate and along each longitudinal margin of the plate there are superposed metal strips 63—66 (Fig. 9) which provide a guideway for the main belt.

*The presser plate*

Above the bedplate is mounted the presser plate construction 67, extending from the fixed convoluter plate 25 to the discharge end of the main belt. The main part of this construction is preferably a casting having a friction facing 67[1] and provided with ribs 68 and 69 as particularly indicated in Figs. 1, 9 and 10 of the drawings. The width of this casting is about the same as the main belt, and the presser plate is pivotally mounted upon the bedplate construction in order that it may be readily swung upwardly to its inoperative position to permit inspection of the main belt, master stick cutter, or other components of the machine.

Whenever it is desirable to inspect the stick engaging surface of the presser plate it is of considerable importance that the attendant may be able to move the presser plate to its Fig. 7 inoperative position as quickly as possible to reduce "outage." To accomplish this end the operator simply flicks downwardly and outwardly a number of cam lock handles 70—74 shown in Figs. 3, 7 and 10 of the drawings. These handles have U shaped members 75—79 at their lower ends, and the latter are formed with cam surfaces engaging the upper surfaces of U shaped lateral projections 80—84 unitary with or fixed to the presser plate as particularly indicated in Fig. 7. Each U shaped member of a cam lock has pivoted thereto the upper end of one of a series of links 85—89 the lower end of which is similarly pivoted to one of the base structures 90—94 fixed to the bedplate.

The cam surfaces of the presser plate locks are so associated with the upper surfaces of the lateral projections 80—84 from the bedplate that as the upwardly extending lock handles are pressed toward the presser plate they press the latter tightly against stops constituting parts of the structures which are rigid with the bedplate.

An advantage of the particular type of cam lock construction here described is that, when it is desired to manufacture candy sticks of a diameter slightly greater or less than those which have just been manufactured, this may be done by loosening the lock base structures 90—94 fixed to the bedplate, and inserting or removing shims between them and the bedplate.

The shims are preferably constructed as indicated at 606 and 608 in Fig. 33. They are formed with slots 610 and 612 to straddle such cap screws as those indicated at 614 and 616 in Fig. 34. This figure shows an arrangement of elements which is applied to the lock base structures 90—94 as well as the hinge base elements 600—604 inclusive.

The cap screws 614 and 616 pass through clear holes in the elements 600 and 620 and are screw threaded into the element 52 as shown. As the cap screws are loosened the coil spring 622 forces the element 600 upwardly by reason of the fact that the former was under compression when the parts were originally assembled. The spring is disposed within a hole drilled in the element 620 and its lower end abuts against the top of 552. Thus, the adjustment of the presser plate structure is facilitated and the time required to insert additional shims or remove some of the shims is minimized.

The shimmed device above described is not specifically claimed in this application but is claimed in the co-pending divisional application 534,788 filed on May 9, 1944.

The operator may quickly unlock the bedplate by flicking the cam levers away from the presser plate, grasping the fixed handles 95 and 96 rigid with the presser plate and then lifting the latter to the position in which it is shown in Fig. 7. Thereupon, the machine components may be readily inspected and the presser plate thereafter returned to its operative position and locked therein in a minimum amount of time.

To facilitate the moving of the presser plate to its inoperative position it is counter-weighted as particularly indicated in Figs. 9 and 10 of the drawings. The counter-weights 97, 98 and 99 shown are adjustably and slidably secured upon rods 97[1], 98[1] and 99[1] which are fixed to the edge of the presser plate opposite the cam locks. To prevent breakage, or bending of the counter-weight rods when the presser plate is moved to its open position, a fender or bumper including a coil spring may be secured to the plate 101 (Figs. 5 and 10) which projects from the presser plate as indicated in Fig. 10. The coil spring extends downwardly and is held in its operative position by an enclosed rod as indicated in my co-pending application.

*The master stick cutter*

As clearly shown in Figs. 7, 10 and 13 of the drawings, the presser plate casting forms a support for a master stick cutter construction indicated as an entirety by the numeral 102 of Fig. 14. This cutter includes a number of blades 103—106 so fixed with reference to the presser plate that their cutting edges are related to the top surface of the main belt in the manner indicated in Fig. 14 of the drawings. The blades are set at a slight incline so that they gradually cut through the convolutions of the convoluted sticks as the latter are rolled along by the movement of the belt, the rear ends of the cutting edges of the blades being positioned at a level spaced above the upper surface of the belt a distance equal to approximately one-half of the diameter of the master sticks. Thus the latter may be said to be given a rolling cut, effective upon the master sticks to produce a result indicated by the comparison of Figs. 27 and 28 of the drawings.

The blades of the stick cutter must have different spacings for candy sticks of different lengths. Sometimes candy sticks 3½ inches long are made and at other times sticks 5 inches long may be made, and the illustrative machine is adapted to produce sticks of such different lengths. To this end the cutter blades are frictionally gripped by the main filler blocks 107—109 which correspond in width to the desired length of candy stick. Such filler blocks are clearly indicated in Figs. 12, 13 and 14 of the drawings.

The cutter assembly includes end filler blocks 110 and 111 preferably of the same length as the main filler blocks and all of these blocks are drilled to provide aligning bores which receive the tie rods or through-bolts 112 and 113. This filler block and rod assembly is set up in a jig upon the cutter base 114 with the transverse aligning projections 115 of the filler blocks fitting into a correspondingly shaped recess in the lower face of the base (see Fig. 14). Then the transverse filler block 116 is secured to the base and the cutter blades are adjusted to their correct projection beyond the operative face of the blocks by adjusting rods 117 and 118 which are freely received by openings in the cutter base and through notches in the edges of the filler blocks. This assembly preferably takes place while the entire cutter organization is inverted, and after the blades are accurately set, the filler blocks are tightened against the blades by through-bolts 112 and 113. Then the cap screws 119 passing through free holes in the cutter base 114 are tightly screw threaded into the filler blocks with their heads in engagement with the upper surface of the base so as to render the entire cutter head or cutter assembly, a rigid unit.

After the cutter assembly is thus completed it is placed in its operative position with reference to the presser plate and held therein by means of the contact of the projections 120 and 121 at the end of the cutter base with ledges or shoulders 122 and 123 on the side portions 124 and 125 of the presser plate (see Fig. 12). These projections are held against these shoulders by clips secured to the presser plate side portions.

To facilitate the manual removal of the cutter assembly from the presser plate the latter is provided along its upper portion with tapped openings adapted to receive the handles 126.

*Stick straightener and stick aligner*

Considering the progress of the compacted rolls through the zones of operation as they are indicated in Fig. 2 of the drawings, and more particularly considering the cutting of the sticks, it has been found that, due to various factors, the sticks will sometimes become slightly bowed, or will attain positions wherein they are out of parallelism (or oblique to their general path of travel) as they proceed through the convoluting and compacting passageways. This action may result from any one of a number of factors, or from a combination of them. For example, the paper may have imperfections here and there so as to vary the resistance of the opposite ends of the sticks to their travel through the compacting passageway.

When the sticks get out of parallelism, or when they become excessively bowed in their travel through the machine they are apt to interfere with the progress of adjacent sticks so as to cause them to pile up and stop the operation of the machine. Furthermore, the stick cutter can operate much more successfully if the sticks are squared up as they roll over the cutter knives 103—106.

For straightening and aligning the sticks as they approach the stick cutter, mechanism which is shown in some detail in Figs. 2, 10, and 12 to 14 inclusive is provided.

Referring particularly to Fig. 2 or Fig. 14, this stick straightening and aligning mechanism includes a frame 127 disposed forwardly of the stick cutter and above the presser plate structure. This frame has rigid therewith a plurality of stick contacting or cam lift members 128—131 which project downwardly through openings in the presser frame. In the present arrangement, four of such members are clearly indicated in Fig. 13. They are aligned transversely of the path of movement of the sticks through the machine, and the master sticks contact these members as indicated by the relationship of the master stick 132 to them as shown in Fig. 13.

The lower ends of the cam lift members 128—131 project into the compacting passageway as indicated in Fig. 14 and their end surfaces are bevelled as indicated at 133 so that as a master stick approaches these surfaces as indicated in Fig. 14 it will have a camming action to cause the pivoted frame to rise.

The rear end of the frame carries a stop bar 134 projecting into the path of the sticks as indicated in Fig. 14, and each stick contacts this bar so as to become straightened or brought into parallelism with the normal to the general path of the movement of the sticks through the machine, before the succeeding stick operates the cam lift members to lift the frame. This action of course raises the stop bar and permits the straightened and squared-up stick to proceed to the cutter knives.

It is essential, in the operation of the stick straightener and aligner that the stop bar and the cam lifts be instantly returned to the positions in which they are shown in Fig. 14, after they have been lifted by the camming action of a master stick passing under the cam lifts, and this is attained by the action of a compression spring 135 on upright stem 136 which is secured to the presser plate. This spring abuts against an adjustable stop 137 on the upper end of the stem so that the rapidity of the return of the cam lifts and stop bar to their Fig. 14 position can be adjusted.

The action of the stick straightening and aligning mechanism may be further modified by a similarly adjustable compression spring 140 which acts upon an arm 141 rigid with the straightener frame and extending forwardly thereof as indicated in Fig. 2. The coil spring of this mechanism is usually under compression so as to urge this arm downwardly toward the bedplate structure, and the force with which this is done can be adjusted in the usual manner.

It is to be appreciated that the master sticks, as they pass through the straightening and squaring-up zone G will more readily be straightened and aligned if they are relieved, to a substantial extent, from the compacting pressure, or the grip with which they are moved through the machine. At the same time, it is necessary that the master sticks be continuously and positively gripped so that their forward movement will not be subject to excessive variation. For example, if for any reason the progress of any certain master stick through the machine should be stopped, then the succeeding sticks would pile up against it and seriously interfere with the operation of the machine.

It is also to be appreciated that, in order to obtain the maximum of stick production upon a given machine, the spacing of the sticks in the convoluting and compacting passageway must be small. It is therefore preferable that the progress of the master sticks must be under positive control at all times. These optimum conditions are attained by relieving the major portions of the master sticks of compacting pressure as they pass from the cam lifts to the stop bars in the zone G. The mid portions of the master sticks are, however, held under advancing pressure by a central strip 142 which projects downwardly from the adjacent surfaces of the lower face of the presser plate facing $67^1$ between the cam lift members 128—131, et seq. and the stop bar 134. The relationship of this strip to the adjoining surface of the presser plate structure is indicated in Fig. 15 of the drawings. The width of this strip projection is but a small fraction of the length of the master stick so that the ends of the latter are relatively free as they move through the straightening and aligning zone. During this movement, and if one of the master strips is oblique to its intended path of advance, its leading end will strike the stop bar under such conditions that the greater part of the stick can be readily deflected and squared up with the stop bar without any appreciable danger of damaging the external convolutions of the stick.

The width of the strip or projection 142 is clearly indicated in Fig. 13 of the drawings, and it will be appreciated from this disclosure that the master sticks are gripped only in a narrow zone at their mid portions.

*The roll stand*

In the illustrative apparatus, the paper, or other sheet material, passes continuously into the machine from the supply roll, and the rotating elements which sever the material into stick strips and the mechanism for crimping the strips so as to initiate their convolution are mounted in a roll stand which is particularly indicated in Fig. 16. The paper is pressed against the constantly rotating presser roll 12 which has been previously described as formed with the diametrically opposed recesses 16 and 17 to receive the saw-teeth or other cutting elements 14 and 15 projecting from the cooperating cutter roll 13. Both of these rolls are positively driven from the same immediate driving element to maintain proper operative registration of the cutter knives and the recesses of the presser roll.

The severed strips of paper are advanced to a position wherein they are, in succession, forced against the crimper roll 19 by the rubber faced roll 20. The latter is pressed against the crimper roll and it is positively driven so that its resilient surface will act to inter-gear these two elements, the paper being crimped over the teeth or flutes of the crimper roll.

The roll stand also provides support for an easily shiftable frame 143 carrying the weighting rollers 144 and 145, the lower one of which is provided with a resilient facing 146 normally pressing the paper against the recessed presser roll 12 so as to cause the paper to be operatively gripped. This causes the paper to be continuously and uniformly pulled from the supply roll at the infeed end of the machine.

In order to afford rigid and adequate support for its components the roll stand includes upright side frame members $146^1$ and $147^1$ secured to the main frame and projecting upwardly therefrom as indicated in Figs. 1, 7, 11, and 16.

*Strip cutting mechanism*

The cutter roll 13 is preferably a steel cylinder journalled in anti-friction bearings in the roll stand sides, and its diametrically opposed knives 14 and 15 are preferably in the form of saw-toothed blades, the teeth of which have such action that they will readily cut through the paper with a minimum of resistance. Their cutting action is also enhanced by the fact that they are arranged to contact with the paper as it is stretched across one of the recesses 16 and 17 in the presser roll, the speed of operation of the crimper roll being so co-related with the strip cutting mechanism as to attain this condition.

The cutter roll 13 and the recessed presser roll 12 are preferably driven at the same speed, and in opposite directions, and this is accomplished by a sprocket chain 148 (see Fig. 18) trained over the top of a sprocket 149 upon the presser roll shaft, underneath a sprocket 150 of similar size on the cutter roll shaft and then over another similar sprocket 151 mounted upon the roll stand countershaft 152 journalled in slidable bearings 153 which are spring mounted in the roll stand frame as indicated in Fig. 16. The shaft for the recessed presser roll 12 is also mounted in slidable bearings 154 which are spring mounted in the roll stand frame. This arrangement of elements permits the presser roll to move slightly to the left (Fig. 16) in the event that the strip cutter ceases to function properly and the paper winds up around the cutter roll. When this happens a disc 155 mounted externally of the roll stand and fixed to the presser roll shaft, contacts a release block 156 and immediately stops the operation of the machine by mechanism which will be subsequently described.

Beyond the position in which the paper is cut into stick strips the paper passes through an upright passage 157 defined on its rearward side by a fixed guide member 158 secured to the roll stand sides, and having its front wall defined by a second guide member 159 which is also designed to fit rather closely into the space between the presser roll 12 and the rubber faced roll 20 which drives the crimper. In this passageway the leading edge of each master strip 18 is guided to the position at which the crimper roll and its rubber faced roll are inter-geared. As soon as these two elements grip the severed strip of paper they so cause the strip to advance that, before the next strip cutting operation takes place, the paper is under tension across a recess of the presser roll as is clearly indicated in Fig. 16.

*The crimping mechanism*

The crimper roll is in the nature of a steel shaft with its surface machined to present such longitudinal flutes or ribs as those indicated at 21. It is also machined with a plurality of longitudinally spaced circumferential grooves which receive strippers in the form of metallic teeth formed as downward projections of the stripper plate 24 which is fixed in upright position at the forward end of the convoluter presser plate 25. These strippers act to remove the crimped strips from the crimper roll in order that the convoluting of the strips may be initiated.

The resilient facing 160 of the crimper presser roll 20 is of sufficient depth to permit desired penetration thereof by the teeth of the crimper roll, and this penetration is capable of variation by the spring mounting 161 of the bearings 162 by which the presser roll is mounted in the sides of the roll stand frame.

*The main belt, and belt moistener*

When coated paper is used as the material from which the sticks are produced, it is essential that some wetting or bonding agent be applied in order that the sticks may become thoroughly bonded. In the present instance, water is utilized as such an agent. The water is applied to and, to some extent, absorbed by the main belt. One advantage of utilizing a belt of absorptive material is that the application of the bonding agent may be effected at the exterior convolutions of the rolls (or master sticks) and at the proper time, in the operation of the machine.

In the illustrative machine the time of effective application of the bonding agent is during the passage of the sticks through the compacting zone F (see Fig. 2). Here, the increased pressure of the sticks against the belt causes the absorbed water to be pressed from the belt and thus applied to the exterior convolutions of the sticks.

The outer surface of the belt is moistened by a roller 163 which is shown in Fig. 1. Preferably this roller is provided with closely spaced circumferential helical ribs so that there may be effective control of the application of moisture. These ribs are in contact with the lower run of the belt and they move through a body of fluid 164 preferably maintained at a constant level in a pan 165. The application of moisture to the belt is controlled by the adjusting of the pan vertically upon its eccentrics 166—168 which support it. By their operation the extent to which the roller and its ribs are immersed in the fluid, may be changed as desired.

Thus as the belt passes over the roller 163, it is given a substantially uniform coating of moisture and this is the condition of the belt throughout the different zones of action which have been previously described with reference to the operation of the machine indicated in Fig. 2 of the drawings. However, these actions take place so rapidly that the water hardly has time to substantially change the texture or condition of the paper to any appreciable extent until the convoluted paper rolls enter the compacting passageway in zone F.

As illustrated in Fig. 1 of the drawings the forward end of the main belt is trained around a roll or pulley 169, the shaft 170 of which is journalled in bearings beneath the roll stand. At the discharge end of the machine, the belt passes over a large diameter pulley 171 which is fixed to a driven shaft 172 so as to act as the driving element for the belt. Beneath the driving pulley, and beyond the position at which all of the completed sticks are discharged from the belt, the belt is subjected to the action of a rotating brush 173 which is positively driven by connections which will hereinafter be described. The purpose of this brush is to keep the belt clean.

Beyond the brush 173 the lower run of the belt passes over a belt tightener pulley 174 which maintains the desired belt tension.

*The paper supply roll mechanism*

At the forward, or infeed end of the machine, the paper supply roll 11 is mounted so as to facilitate the removal of the shaft 175 upon which is left the core of an exhausted paper supply roll and also to facilitate the substitution of a full supply roll. As illustrated, the supply roll shaft is supported by bearings upon the forward extensions 49 and 50 of the main frame members, and these bearings are formed by spaced rollers 176 and 177 which act to cradle the supply roll shaft (as indicated in Fig. 22). The latter is nonrotatably mounted in the core 178 of the supply roll. This shaft is held upon the spaced rollers by a cooperating roller 179 rotatingly mounted in the end of a sliding block 180. The latter may be releasably secured to a bearing support resting upon the forward extensions of the main frame members. This arrangement of elements (see Figs. 22, 23 and 24) is such as to enable the operator to quickly place a new supply roll in operative position.

For minimizing production costs, a maximum percentage of the paper or other sheet material should be utilized in the ultimate product and, to this end, the width of the paper in the supply roll should be little more than a multiple of the lengths of the sticks produced. This means that the movement of the paper strip into the machine must be closely controlled at its edges, and this is made difficult because of variations in the winding of the paper upon the supply rolls. For example, some rolls may be appreciably "dished" or concave on one side, and when this is the case it is important that there be some means for correcting this condition and aligning the feed roll strip with the roll stand elements and with the remaining operative components of the machine. Such means are indicated in Figs. 22, 23 and 24 of the drawings. It includes two spaced annular members 181 and 182 which are fixed upon the outer end of the supply roll shaft 175. These members may constitute parts of a sleeve which is fixed upon the shaft and arranged to form a circumferential groove between them. In operation, the spaced parts 183 and 184 of an adjusting head 185 are closely received between the spaced ring members 181 and 182 as indicated in Figs. 22, 23 and 24. This head includes a block 186 slidably mounted upon the upper end of an arm 187 pivoted at an intermediate position to the main frame by the pin 188 and having its lower end formed with a slot 189 to receive the stem 190 of a clamp screw 191 by which the arm 187 is securely anchored in its operative position. This arm is shown in its inoperative position in Fig. 22 and it may be held in this position by the tightening of the intermediate clamp screw 192.

When the pivoted arm is in the position shown in Fig. 22, it permits the installation of a new supply roll, and after the shaft of the latter is in position the intermediate clamp screw 192 is released, and the arm 187 swung clockwise from the position in which it is shown in Fig. 22. Then the clamp screws 191 and 192 are tightened so as to hold the arm in its upright or operative position.

The slidable head 186 of the pivoted arm structure is movable relative to the remainder of the structure by means of an adjusting screw 193 which is freely rotatable in a depending part 194 of the head and is screw threaded into the upper end of the main part of the arm structure as indicated in Fig. 23.

The extent of movement of the head 186 laterally of the main part of the pivoted arm 187 is small but it is sufficient to compensate for imperfections in the winding of the paper upon the supply roll. The extent of movement of the head with reference to the arm is indicated by the length of the slots 195 and 196 in this head. These slots (see Fig. 24) receive the stems of the pins or cap screws 197 and 198 which are preferably threaded into the main part of the pivoted part of the main arm structure. Any twisting or turning of the head with reference to the base may be prevented by a longitudinal groove and rib construction, which is indicated in Fig. 23 at 199 and 200.

In the operation of the machine the attendant carefully notes the condition of the sides of the supply roll and, when he sees that the paper is about to unwind at a position at which it is imperfectly wound he will turn the adjusting screw to compensate for this imperfection and thus eliminate difficulties which would otherwise impair the operation of the machine.

It will be noted that the operation of the adjusting screw 193 affords a precision adjustment of the slidable head with respect to the remainder of the supply roll aligner. Also the threads 201 of the adjusting screw are such that fine adjustment is afforded.

The supply roll mounting and control mechnaism just described is not claimed in this application but is specifically claimed in the copending divisional application 518,827, filed on January 19, 1944.

The supply roll is unwound by the pull exerted upon the paper by the rollers associated with and constituting a part of the strip cutting mechanism. The paper first passes in a straight run around a tensioning roller 202 supported at the rearward or upward end of a pivoted frame. The side members 203 and 204 of this frame are mounted so as to pivot around the axis of the supply roll and the frame is biased downwardly by a coil spring 205 as indicated in Fig. 1 of the drawings. Thus the paper strip unwinding from the supply roll is maintained under tension without involving any unnecessary whip of the tensioning mechanism as the resistance to the advance of the paper varies. Sidesway of this pivoted frame may also be eliminated by the provision of vertical guide members 206 and 207 fixed to the frame of the machine and disposed in contact with outer surface of the side frame members 203 and 204 as indicated in Fig. 3 of the drawings.

Beyond the tensioning roller 202 the paper passes through an opening 208 at the front end of the supply roll brake 209, and between that brake and a guide rod or roller 210 which is particularly indicated in Fig. 16 of the drawings as mounted upon standards 211 and 212 fixed to the main frame at a position forwardly of the roll stand.

After a supply roll is mounted in operative position as above indicated, the brake mechanism is placed in position with its forward end pivotally mounted upon the rod or roller 210 and with its under surface in contact with the periphery of the paper supply roll as indicated in Fig. 4 of the drawings. The paper is then pulled from the supply roll, passed underneath the tensioning roller 202 and then upwardly through the opening 208 at the front of the supply roll brake. It is then folded back so that its leading end is passed underneath a straight-edge 213 which is mounted near the forward end of the supply roll brake as indicated in Fig. 16. This straight-edge extends across the brake member 209 and is normally biased upwardly to a position spaced from the upper surface of the brake member by coil springs 216 and 217 the tension of which can be adjusted by operation of the thumb nuts 218 and 219 clearly shown in Fig. 16. Normally, however, this straight-edge is so spaced from the upper surface of the brake member that the leading end of the paper may be easily passed through the opening between the lower surface of the straight-edge and the upper part of the brake member. The straight-edge is then manually pressed downwardly tightly against the paper and its irregular leading edge is torn off so as to form a straight leading edge. This edge is then threaded over the rod 210 and then around the presser roll 12. Preferably its leading edge is moved around the presser roll until it contacts with one of the cutter knives, and the roll 12 is turned just enough to cause the leading edge of the paper to be gripped. Then the weighting roller frame is moved from its Fig. 17 inoperative position to the position in which it is shown in Fig. 16.

In order that the weighing roller frame may be easily moved from its operative position to the position in which it is shown in Fig. 17, the frame is provided with an adjustable counterweight 220 which is shown in Fig. 16 as disposed in position rearwardly of the weighting roller frame. The frame 143 is also provided with stops 221 and 221[1] which contact the top of the roll stand and limit the movement of the frame. When the frame is so moved as to enable the paper to be threaded into the machine (to its raised position, Fig. 17) the stop 221 engages the roll stand frame and when the frame is in its normal position the stop 221[1] limits the forward and downward movement of the frame. The ends of pressure rolls 144 and 145 are journalled in bearing boxes freely slidable in the frame 146 so that the full weight of roll 145 plus the weight of roll 144 is upon roll 12 but the weight of the frame 143 is not added to the pressure of roll 145 on roll 12 because the stop 221 rests on the roll stand when the frame is in its Fig. 16 position.

As also indicated in Figs. 16 and 17 of the drawings the weighting roller frame 143 is provided with a handle 222 mounted upon a crankarm 223 which may be conveniently fixed to a rod 224. The roller frame is fixed to this rod as to turn within the side frame members of the roll stand. The crankarm 223 is located externally of the roll stand so that it will be convenient to the operator.

The brake member 209, indicated in Figs. 1 and 16 of the drawings preferably consists of a flat base which is provided with a weight 224 at a position above its contact with the supply roll. This weight plus the weight of the entire brake structure being such as to prevent overrunning of the supply roll and to cooperate with the tensioning roller 202 to maintain the paper tension within the desired limits. This frame is also freely pivotable about the guide rod 210 and for that purpose it is provided at its forward end with side yokes 210[1] which fit closely about the upper surface of the guide rod and permit the entire brake mechanism to be easily lifted from its operative position so as to enable the operator to quickly dispose a new supply roll in its operative position.

*The driving mechanism*

The parts of the illustrative machine are so arranged that the drive is initially, to the discharge end of the main conveyor belt, or carrier 28. This has the advantage that the belt is put under tension throughout the operative zones of the machine as indicated in Fig. 2 of the drawings. An additional advantage is that the conveyor belt thus acts as a driving means for the cutting, crimping and feeding mechanism. By this arrangement the operation of the strip cutting mechanism may be independently stopped under certain conditions, and, thereafter, the conveyor belt will tend to continue its movement until the operative zones (see Fig. 2), are freed of the advancing sticks. This is important because the sticks, if permitted to remain stationary in the operative zones above the belt will have a tendency to pick up an excessive amount of moisture from the belt and be thereby ruined.

The motor 48 drives a first counter-shaft 225 by means of a series of endless belts 226 trained around a pulley 227 of small diameter on the motor shaft and a pulley 228 of considerably larger diameter upon the counter-shaft 225.

The drive from the first counter-shaft takes place through a driving sprocket pinion 229 fixed to the first counter-shaft and operatively engaged by a sprocket chain 230 which passes around a sprocket wheel 231 of considerably larger diameter disposed upon a second counter-shaft 232 rotatably mounted in the frame of the machine beneath the discharge end of the main supply belt. From the second counter-shaft power is transmitted to the shaft 172 by a sprocket chain 234, and a sprocket pinion 233 fixed upon that counter-shaft. Around this pinion is trained the sprocket chain 234 which passes around a sprocket wheel 235 of considerably larger diameter fixed upon the shaft 172. This sprocket chain is maintained in appropriate driving condition by an idler sprocket 236 rotatably mounted upon the end of a crankarm 237 which is biased upwardly by a counter-weight 238 adjustably mounted rearwardly on a rod 239. For maintaining the idler sprocket against the main drive chain the crankarm and the counterweight arm are mounted so that they move as a unit. Preferably this unitary construction pivots freely around a counter-weight rod 240, this construction permitting the arrangement of the flat belt tightener pulley 174 between the side frame members, as indicated in Fig. 1 of the drawings. This belt tightener pulley is freely rotatable upon the ends of crankarms 241 which are fixed to the counter-weight rod, and it is biased toward the main pulley on the conveyor belt by a counter-weight 242 and counter-weight arm 243 fixed to the counter-weight rod.

The drive by means of the conveyor belt to the crimper and strip cutting mechanism at the forward end of the machine takes place through a shaft 169 upon which the roll or pulley 170 is fixed. This shaft is rotatably mounted in bearings supported by the main frame and it is arranged with one end, remote from the operator's control station, extending beyond the side frame member so as to receive a control belt pulley 246. The latter is preferably constructed with a flat belt face and marginal flanges to hold the belt an the pulley. A similar flat belt pulley 247 is fixed to a third counter-shaft 248 rotatably mounted at a position beneath the roll stand as indicated in Figs. 18 and 20 of the drawings.

Trained around the flat belt pulleys 246 and 247 is a control belt 249 which may drive the third counter-shaft and control the starting speed of the machine, depending upon the degree to which the belt is tightened by the belt tightener pulley 250. This pulley is rotatably mounted at the end of a crankarm 251 fixed to a control rod 252 which extends through the frame and exteriorly thereof at both sides. Near the operator's station from which side of the machine Figs. 3 and 7 are taken, this rod 252 is provided with a handwheel 253 by means of which the operator may closely control the operation of the roll-stand mechanisms by varying the degree of tightness of the control belt 254. Thus when the paper is threaded into the paper feeding mechanism as has been indicated above, the operator may cause the paper feeding mechanism to gradually start up by slightly tightening the control belt upon its pulleys.

The operative parts in the roll stand are driven from the third counter-shaft by means of a sprocket chain 254 trained around a sprocket wheel 255 fixed to the third counter-shaft and also trained around an upper sprocket pinion 256 rotatably mounted in the roll stand. The drive from this pinion to the roll stand elements takes place as above described.

The Control Mechanism

*Automatic interruption of the roll stand drive caused by condition of the supply roll*

It has been found that the condition of the paper near the center of many supply rolls is such that it will not properly pass through the machine and form the illustrative sticks in the desired manner and for this reason it is important that the infeed of paper into the machine be interrupted while several feet of the paper still remain upon the supply roll. Otherwise the folded up or deformed paper near the end of the strip on the supply roll will cause the machine to become clogged with imperfectly formed sticks, and much valuable time will be lost while the machine is being cleared. Therefore, the illustrative machine includes mechanism by which the infeed of paper is stopped automatically at a time in the operation of the machine when there is but a few feet of paper left upon the supply roll.

The mechanism for accomplishing the above indicated result includes a presser head 257, (indicated in Fig. 1 of the drawings) normally in contact with the periphery of the supply roll. This head is preferably integral with an arm 258 fixed upon a rod 259 mounted in bearings in the frame of the machine at a position beneath the supply roll. Toward one end of the rod, and at a position laterally of the supply roll, this rod is provided with a sprocket pinion 260 fixed thereto. A sprocket chain 263 is trained around this pinion and a similar pinion 261 fixed upon an upper stub shaft 262. The latter is biased in one direction by a counter-weight 264 adjustably and releasably mounted on a rod 265 fixed to the stub shaft. By this arrangement of elements the presser head is held lightly against the surface of the supply roll and the rod 259 is permitted to gradually turn in a counter-clockwise direction (see Fig. 1) as the supply roll diminishes in diameter. As this action takes place the crankarm 266, fixed upon the rod 259 at the side of the machine remote from the operator's station, moves correspondingly so that a pin 260[1] secured in its upper end rides in a slot 261[1] formed in a control link 262[1] which is movable from the vertical position in which it is indicated in Fig. 18 of the drawings to a horizontally inclined position in which it is indicated in Fig. 20.

This link seal 262[1] is shown in Fig. 18 in the position in which it is disposed when the presser foot is engaging the periphery of a new supply roll and Fig. 20 indicates the position of the link at the time when the movement of paper from the supply roll has just passed a point at which it is desired that the operation of the paper feeding mechanism be automatically stopped.

As the crankarm 266 moves from its Fig. 18 position to its Fig. 20 position it exerts a pull upon the control link 262[1] and consequently causes a counter-clockwise movement of a detent link 267 to which the control link is pivotally connected. This detent link is pivotally mounted at the lower end of a sleeve 268 which forms a guide for a vertically movable main control rod 269, the latter being provided near its lower end with a recess 270 in which the detent 271 of the link is received when the parts are in the positions indicated in Fig. 18.

Under conditions of normal operation the detent link 267 is held at the extreme limit of its clockwise movement as indicated in Fig. 18. The detent 271 is held within the recess 270 of the control rod and the latter is thus prevented from falling to the position in which it is indicated in Fig. 20.

When the paper supply roll is so depleted that it causes the detent link 267 to disengage the control rod, the latter drops and falls upon a part 273 of a bellcrank 274 and causes the other arm 275 of the latter to act against a pin 276 carried by an arm 277 of the detent for the main control weight 277[1]. The latter is guided vertically by a housing 278 and its upper end is connected by a cable 279 to the rim of a large diameter grooved wheel 280 fixed upon the handwheel shaft or control rod 252. By reason of this arrangement of elements the relation of the detent for the main weight, or the movement of this detent from its Fig. 18 position to its Fig. 20 position permits the main weight to drop as indicated, and, consequently, to so turn the control rod 252 for the belt tightener pulley that the drive from the third counter-shaft to the paper feeding mechanism is interrupted. The main weight is such that it overbalances the effect of a counter-weight 282 mounted upon a crankarm 283 rigid with the belt tightener control rod. Under normal operation this counter-weight holds the belt tightener pulley in such position that power is continuously transmitted to the roll stand.

The detent 284 for holding the main control counter-weight in its elevated position is held in engagement with ratchet teeth 285 upon the for- [illegible]

[illegible]

20 and 21 of the drawings also includes means for causing the paper feeding mechanism drive to be automatically interrupted in the event that the infeeding paper does not proceed through the roll stand mechanism and to the crimper in the proper manner. In such a contingency the paper is apt to wind up or bunch up around the cutter roll and consequently cause the presser roll 12 to be moved slightly to the left (see Figs. 18 and 20). When this action takes place the disc 155 at the end of the presser roll shaft contacts with the release block 156 in the manner indicated in Fig. 21. [illegible]

[illegible]

their arrangement with respect to the operative parts of the machine are schematically shown. This system includes a magnetic switch operable by secondary circuits to close or open the power line circuit leading to the driving motor. It also includes a plurality of limit switches for opening or closing the secondary circuits. As shown in Fig. 25, a normally open limit switch $B^1$ is provided in a secondary circuit which may include the conductors 500 to 504 inclusive, or the conductors, 500, 501, 502 and 505. This limit switch is provided with a latching mechanism 506 which is adapted to releasably or selectively hold the switch closed under circumstances which will receive reference. The position of this limit switch $B^1$ with respect to the operator's station is also indicated in Fig. 3 of the drawings.

The secondary control circuits of the electrical control system also include a normally closed limit switch $D^1$, which is adapted to be opened by the operation of a centrifugal governor indicated in Fig. 19 of the drawings. The centrifugal elements of this governor are driven by the contact of the belt moistener roller with the belt and hence, their speed of rotation varies as the speed of the belt. During normal operation, the centrifugal governor control arms 508 and 509 are in their elevated position so as to hold an upper contact member 510 out of contact with the operator for the limit switch $D^1$, but when the speed of the main conveyor belt decreases to an undesired extent the centrifugal arms fall to their dotted line positions indicated at 511 and 512 in Fig. 19. This permits the contact member 510 to open the limit switch $D^1$ and thus break the secondary control circuit through the conductors 503, 504 and 505. This action so affects the magnetic switch that the power to the driving motor is interrupted.

The limit switch $E^1$ is associated with the main control rod 269 as clearly indicated in Fig. 25 and when the main control rod is at the upper limit of its path of movement a secondary circuit is completed through the conductors 515 and 502, through the internal switch connection 532 of the start and stop switch $A^1$ (this part of the start and stop switch being normally closed so that operation of the push button 522 will interrupt the connection between the terminals 520 and 521), the line 503, the closed limit switch $D^1$, the line 504, the magnetic switch 518 and, that part of the main line closed by the manually operated switch 519, the line 501, and through the line 517 back to the limit switch $E^1$. Thus the two limit switches $D^1$ and $E^1$ which stop the operation of the machine upon the occurrence of a number of undesired eventualities are in series so that the opening of either one of these switches by any of said eventualities stops machine operation automatically.

In starting the machine anew, or after it has been automatically stopped as above described, the limit switch $B^1$ is locked closed by the positioning of the latch 506 in contact with the previously depressed switch element 530. Then the starting button 531 of the switch $A^1$ is pressed so as to close the secondary circuit through the line 505, that part of the main line closed by the switch 519, the line 501, the line 500, the limit switch $B^1$, line 502, the terminal 521, the internal switch connection 532, the internal switch connection 533, and a third internal switch connection contacting the terminals 534 and 535 when the push button 531 is depressed. This will throw the switch 518 and hold it closed so that power is transmitted to the driving motor, and as soon as the machine, and more particularly the carrier belt, attains normal speed the limit switch $D^1$ will be allowed to assume its normal closed position by reason of the operation of the centrifugal governor. Thereupon the latch 506 is thrown to its disengaged position in which it is shown in Fig. 25, and the parts of the control mechanism are then arranged so as to accomplish the automatic control which is above described.

The General Apparatus

As the machine operates, the master sticks which have been cut to candy stick lengths by the above described mechanism start to pass around the driving pulley at the discharge end of the carrier belt and they remain thereon for a short distance by reason of the moisture upon the sticks and the belt. However, the sticks, on account of the moisture thereon, must be dried before they can be shipped, and they are therefore delivered from the machine to a drying mechanism which is indicated in Fig. 6. They are caused to be deposited upon the upper run of a dryer belt 540 by the action of a wiper bar 541 which is fixed so that its thinner edge is close to the surface of the belt and at a position near the infeed end of the dryer belt 540.

As the cut sticks proceed over the discharge end of the main carrier belt they are also accompanied by the small salvage ends of the sticks and these are accumulated by additional wiper members or cam members, set as indicated in my co-pending application previously referred to. Preferably these salvage ends are caused to pass to the inlet end of an air duct 542 which is connected to an exhaust system. Warm air is supplied through the discharge duct 543 and the branch ducts 544—546 as indicated in Fig. 6.

The primary dryer belt 540 has its upper run advancing in the direction of the arrow 550 (see Fig. 6) and the sticks are discharged at the left hand end of that belt upon a second dryer belt 551, the upper run of which is proceeding in the direction of the arrow 552. The movement of the sticks through the drying apparatus is again reversed as they pass over the surface of the belt 553 to the bin 554.

Fig. 26 of the drawings is intended to illustrate the action of one of the knives 105 cutting through a master stick 132, and it will be remembered that these sticks are so rolled under the knives that the knives gradually penetrate the stick convolutions. This rolling action, in combination with the condition of the paper in the sticks, and an additional bringing of moisture to the surface of the paper at the cut causes the cut ends of the sticks to be homogenized or cemented together so that they present the appearance of smooth uniform surfaces as indicated in Fig. 28. This is to be contrasted with the structure of the main body of the product as indicated in Fig. 27. This adds materially to the appearance and therefore the saleability of the ultimate confection product 400 such as that indicated in Fig. 31 of the drawings.

Fig. 30 of the drawings is intended to indicate the type of fracture 402 which occurs when the illustrative candy sticks are subjected to a sudden endwise impact. It is advantageous that they break in this manner so that the paper convolutions do not excessively unravel; it is also an advantage that this type of fracture occur in order that the remainder of the illustrative stick, still anchored to the confection body, may still be utilized in the manner somewhat similar to that originally intended to be applicable to the entire stick.

Although the invention has been described with reference to certain specific and preferred embodiments it is to be appreciated that the invention is not limited to all of the details thereof, but that it is, rather, of a scope commensurate with the scope of the subjoined claims.

I claim:

1. In apparatus for the manufacture of dowel-like rods from thin sheet material, a convoluter acting upon sheets of said material and curling them up to form loosely convoluted master rolls, a compacter further convoluting said rolls and reducing their diameter until they form hard and rigid master rods, rod-severing mechanism including cutters extending parallel to the direction of advance of said rods, a stop extending in a direction at right angles to said cutters and in the path of said advancing master rods, means disposed in a zone forwardly of the stop whereby the elements of the compacter act upon the master rods with a grip or pressure less at the ends of the rods than between their ends, the leading ends of any askew rods thereby first contacting the stop to square-up the rods against the stop, and means for momentarily withdrawing said stop after each rod is squared-up to release the rod and permit it to advance through the rod-severing mechanism.

2. In a dowel making machine, a convoluter to form loosely curled up rolls from sheet material, a compacter forming master dowels from said rolls, the compacter maintaining an advancing rolling action and grip upon the rolls and dowels, a cutter severing each dowel at a plurality of points while it is held under compacting pressure, and a dowel straightener and aligner including a stop and means disposed in advance of the stop whereby the elements of the compacter in the zone of the straightener have a dowel advancing grip effective only on portions of the dowels intermediate their ends to cause the leading end of any askew dowel to first contact said stop to initiate the squaring-up of the dowel with the cutter, said straightener and aligner being operative in a zone in advance of the cutter.

3. A rod cutter including a plurality of blades, rod rolling means causing non-metallic rods to be gripped as they advance toward and through the cutter and in contact with said blades, a stop immediately forward of the blades and in the path of the advancing rods, means forwardly of the stop to limit the advancing grip to the intermediate portions of the rods so that their end portions will be the first parts to contact the stop when askew rods are squared-up by the action of said means and the stop, and means actuated by a following rod to move the stop from its operative position and permit the squared-up rod to advance through the cutter.

4. In a machine for manufacturing rods by convoluting strips of sheet material, a convoluter, a compacter for forming master rods longer than a plurality of the ultimate products, means for cutting the master rods into a plurality of lengths, and a rod aligner including a stop member set at an angle of 90° to the line of advance of the master rods, said aligner also including rod pressing and advancing means limited to intermediate portions of the compacter and the rods for maintaining a rod advancing grip only on the intermediate portions of the master rods while the remaining portions of the master rods are liberated from compacting pressure in order that the rods may be readily squared-up against the stop member.

5. A method of forming small diameter rods from flat material, convoluting said material to form loosely wound rolls, compacting the rolls into smaller diameter rods and simultaneously causing them to assume a permanent set, momentarily liberating the end portions of the rods from compacting pressure while maintaining such pressure at intermediate portions of the rods so that they become straightened, bringing the rods into parallelism, and severing the compacted rods into desired lengths after they are brought into parallelism.

6. In a method of forming small diameter rods, convoluting sheet material to form loosely wound rolls, convoluting the rolls to compact them and form small diameter rods, and reducing the compacting pressure on the end portions of the rods while maintaining such pressure at portions of the rods intermediate their ends to permit the rods to straighten while their advance through the compacting zone is maintained.

7. In apparatus for manufacturing rod like members by convoluting sheet material; a supply roll from which said sheet material is unwound; a strip cutter; a strip crimper; a strip convoluter; a compacter; an operator for driving the compacter; driving connections including the compacter for operating the cutter and convoluter; means responsive to the peripheral speed of the compacter to stop the operation of the compacter, cutter, and convoluter when said speed falls below a predetermined rate; control means including a selectively set device for bringing the compacter up to normal speed independently of said speed responsive means; automatic means responsive to an undesired accumulation of said sheet material in the zone of the cutter to stop the operation of the cutter, convoluter, and compacter; independently operable means to stop the operation of the cutter, convoluter, and compacter when the supply roll reaches a predetermined diameter; and manually operable means to independently initiate and vary the speed of the cutter and crimper after the compacter is brought to normal speed.

8. A method of forming small diameter rods from flat material, convoluting strips of the material to form loosely wound tubular rolls, compacting the rolls to form rods by further convoluting them, causing the convoluted rods to have a permanent set, said compacting action causing the rods to have a continuous rolling advance through the compacting zone and into a succeeding squaring-up and rod straightening zone, decreasing the compacting or convoluting pressure on parts of the rods in the squaring-up zone to facilitate the straightening of the rods and squaring them up with the normal to their path of advance through said zones.

HIRAM A. PERKINS.